United States Patent
Kodama et al.

(10) Patent No.: US 7,485,696 B2
(45) Date of Patent: Feb. 3, 2009

(54) OXYTETRAMETHYLENE GLYCOL COPOLYMER AND METHOD FOR PRODUCING THE SAME

(75) Inventors: Tamotsu Kodama, Delft (NL); Haruyuki Minoura, Kurashiki (JP); Yoshiyuki Tsunematsu, Kurashiki (JP); Toshihiko Fukuzono, Kawasaki (JP); Satoshi Furubeppu, Tokyo (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 11/730,523

(22) Filed: Apr. 2, 2007

(65) Prior Publication Data

US 2007/0173631 A1    Jul. 26, 2007

Related U.S. Application Data

(62) Division of application No. 10/250,859, filed as application No. PCT/JP01/03230 on Jul. 9, 2003, now Pat. No. 7,217,783.

(30) Foreign Application Priority Data

Jan. 11, 2001 (JP) .................... 2001-003810
Jan. 11, 2001 (JP) .................... 2001-003899

(51) Int. Cl.
*C08F 6/10* (2006.01)
*C08F 2/06* (2006.01)

(52) U.S. Cl. .................... 528/494; 528/501; 528/503

(58) Field of Classification Search .......... 528/403, 528/405, 409, 480, 494, 497, 501, 503
See application file for complete search history.

(56) References Cited

U.S. PATENT DOCUMENTS

| 4,658,065 A | 4/1987 | Aoshima et al. |
| 4,677,231 A | 6/1987 | Aoshima et al. |
| 4,728,722 A | 3/1988 | Mueller |
| 6,570,041 B1 | 5/2003 | Kodama et al. |
| 7,217,783 B2 * | 5/2007 | Kodama et al. ............. 528/501 |
| 2001/0041772 A1 | 11/2001 | Masubuchi et al. |

FOREIGN PATENT DOCUMENTS

| JP | 61-126134 | | 6/1986 |
| JP | 61126134 A | * | 6/1986 |
| JP | 10-25340 | | 1/1998 |
| JP | 10025340 A | * | 1/1998 |
| JP | 10-87811 | | 4/1998 |
| JP | 10-87813 | | 4/1998 |

OTHER PUBLICATIONS

Aoshima et al., JP-61126134—English abstract Jun. 1986.
Aoshima et al., JP-61126134—Derwent English abstract Jun. 1986.
Aketo JP-10-025340- Machine English Translation obtained from JPO website E Jan. 1998.

* cited by examiner

Primary Examiner—Timothy J. Kugel
(74) Attorney, Agent, or Firm—Finnegan, Henderson, Farabow, Garrett, & Dunner, L.L.P.

(57) ABSTRACT

Disclosed is an oxytetramethylene glycol copolymer, which is obtained by copolymerizing tetrahydrofuran and neopentyl glycol and which has a specific number average molecular weight Mn, a specific molecular weight distribution Mw/Mn, a specific neopentyl glycol copolymerization whole ratio $N_w$ and a specific neopentyl glycol copolymerization partial ratio $N_h$, and a method for producing the same. Also disclosed is a method for purifying an oxytetramethylene glycol copolymer, which comprises adding a fresh tetrahydrofuran to a reaction mixture comprising an oxytetramethylene glycol copolymer and an unreacted diol, wherein the amount of added tetrahydrofuran is not less than the weight of the unreacted diol contained in the reaction mixture, and distilling off the unreacted diol together with the added tetrahydrofuran.

4 Claims, 5 Drawing Sheets

OXYTETRAMETHYLENE GLYCOL COPOLYMER AND METHOD FOR PRODUCING THE SAME

RELATED APPLICATIONS

This application is a divisional of application Ser. No. 10/250,859, filed Jul. 9, 2003, now U.S. Pat. No. 7,217,783 which is a §371 of International Application No. PCT/JP01/03230 filed Apr. 16, 2001, which claims priority of Japanese Applications Nos. 2001-3810 and 2001-3899, both filed Jan. 11, 2001, the contents of all of which are incorporated herein by reference.

BACKGROUND OF THE INVENTION

1. Field of the Invention

The present invention relates to an oxytetramethylene glycol copolymer and a method for producing the same. More particularly, the present invention is concerned with an oxytetramethylene glycol copolymer obtained by copolymerizing tetrahydrofuran and neopentyl glycol, wherein the oxytetramethylene glycol copolymer has a specific number average molecular weight, a specific molecular weight distribution and a specific neopentyl glycol copolymerization ratio. The present invention is also concerned with a method for producing such an oxytetramethylene glycol copolymer. The oxytetramethylene glycol copolymer of the present invention exhibits improved low temperature properties due, for example, to low melting point and low glass transition temperature. By virtue of these improved properties, the oxytetramethylene glycol copolymer of the present invention can be advantageously used as a raw material for an elastic fiber and the like. Further, the present invention is concerned with a method for purifying an oxytetramethylene glycol copolymer, obtained by copolymerizing tetrahydrofuran and a diol by the method of the present invention or any conventional method, from a copolymerization reaction mixture comprising an oxytetramethylene glycol copolymer and an unreacted diol, wherein the unreacted diol is distilled off in the presence of fresh tetrahydrofuran. By the use of the purification method of the present invention, it becomes possible to not only purify the copolymer without causing the clogging of a condensation tube and a conduit by the solidification of the diol, but also recover a recyclable diol.

2. Prior Art

Recently, an oxytetramethylene glycol copolymer obtained by copolymerizing tetrahydrofuran (THF) and a diol (such as neopentyl glycol) and an oxytetramethylene glycol copolymer obtained by copolymerizing THF and 3-methyltetrahydrofuran have been drawing attention. An oxytetramethylene glycol copolymer has a lower melting point than an oxytetramethylene glycol homopolymer (that is, polyoxytetramethylene glycol (PTMG)), and an elastic product produced using an oxytetramethylene glycol copolymer as a raw material exhibits remarkably improved elongation, hysteresis loss and low temperature properties, as compared to those of an elastic product produced using PTMG as a raw material. For example, at a temperature below the ice point, a conventional polyurethane urea elastic fiber produced using PTMG exhibits no instantaneous elastic recovery, but a polyurethane urea elastic fiber produced using an oxytetramethylene glycol copolymer exhibits an instantaneous elastic recovery which is substantially the same as observed at room temperature.

An oxytetramethylene glycol copolymer can be easily synthesized by using a heteropolyacid as a polymerization catalyst. For example, each of Unexamined Japanese Patent Application Laid-Open Specification No. Sho 60-203633 (corresponding to European Patent Publication No. 158,229B), Unexamined Japanese Patent Application Laid-Open Specification No. Sho 61-120830 (corresponding to European Patent Publication No. 158,229B) and Unexamined Japanese Patent Application Laid-Open Specification No. Sho 61-123630 discloses an oxytetramethylene glycol copolymer obtained by copolymerizing a diol and THF in the presence of a heteropolyacid in either a batchwise manner or a continuous manner. In the technique of each of the abovementioned patent documents, diol molecules are incorporated, into the oxytetraethylene glycol copolymer chains, mainly as a terminator for the living cationic polymerization of THF. Therefore, most of the diol molecules which are incorporated into the polymer chains are present at the terminals of the polymer chains and the average diol copolymerization ratio is approximately one molecule. According to the reaction modes disclosed in the abovementioned patent documents, the average number of diol molecules that can be incorporated into a copolymer molecule (that is, average diol copolymerization ratio) is approximately 1 molecule and, thus, there is a limitation in the melting point-lowering effect of the copolymerization of a diol (copolymerization effect). In addition, in the above-mentioned patent documents, removal of water during the copolymerization reaction is disclosed as a method for increasing the copolymerization ratio of a diol (specifically, to achieve a copolymerization ratio as high as approximately 10 to 35 moles). In this method, when a water removal step is conducted in addition to the standard copolymerization step, there is a limitation that the number of water molecules coordinated to a heteropolyacid used as the polymerization catalyst must be in the range of from 0.1 to 15. Especially when a copolymerization reaction is conducted using a heteropolyacid having a water coordination number as high as 6 to 15, the reaction rate becomes markedly lowered. As a consequence, the time of polymerization becomes very long and only an oxytetramethylene glycol copolymer having a broad molecular weight distribution can be produced using such a heteropolyacid. An oxytetramethylene glycol copolymer having a broad molecular weight distribution has a problem in that the glass transition temperature is high.

Further, working examples of Unexamined Japanese Patent Application Laid-Open Specification Nos. Hei 6-87951, Hei 9-291147, Hei 10-87811, Hei 10-87812, Hei 10-87813 and the like disclose methods for incorporating 1 to 5 moles of neopentyl glycol (NPG) into 1 molecule of an oxytetramethylene glycol copolymer. Specifically, each of these patent documents discloses a method which comprises polymerizing NPG and THF in the presence of a heteropolyacid catalyst in a batchwise manner, wherein the polymerization reaction is performed while removing the by-produced water from the reaction system by distillation. In a batchwise reaction, even when the NPG concentration is high at the initial stage of the reaction, the NPG concentration of the reaction system becomes markedly lowered at the final stage of the polymerization reaction. Therefore, low molecular weigh copolymers having high NPG copolymerization ratio are likely to be produced at the initial stage of the polymerization reaction. The thus produced low molecular weight copolymers having high NPG copolymerization ratio are likely to polymerize and mature into high molecular weight copolymers, thereby producing a high molecular weight copolymer having a relatively high copolymerization ratio. Due to the presence of such a high molecular weight copolymer having a high copolymerization ratio, the glass transition temperature of the copolymers as a whole is caused to become high, thereby rendering it difficult to produce an oxytetramethylene glycol copolymer having a low glass transition temperature.

As mentioned above, an oxytetramethylene glycol copolymer is produced by the copolymerization reaction of THF and a diol in the presence of a heteropolyacid as a polymerization catalyst. Several hundred ppm to several percent of an unreacted diol usually remains in the reaction mixture obtained after the copolymerization reaction, and when an elastic product (e.g., an elastic fiber, such as urethane urea) is produced using an oxytetramethylene glycol copolymer containing residual unreacted diol, the elastic product is incapable of exhibiting the intended properties because the residual diol (such as unreacted NPG) do not function as a soft segment. For solving this problem, it was attempted to perform the copolymerization reaction under conditions which enable a complete consumption of the diol or, alternatively, to remove unreacted diol from the copolymer containing the unreacted diol.

For achieving the complete consumption of the diol during the copolymerization reaction, it is necessary to conduct the copolymerization reaction in a batchwise manner at a high reaction temperature while removing the by-produced condensation water thoroughly from the reaction system so as to shift the reaction equilibrium. When the residual amount of the unreacted diol is lowered by this method to less than 100 ppm, adverse side reactions, such as liberation of terminal hydroxyl groups from the diol as well as from the produced oxytetramethylene glycol copolymer, are likely to occur due to the action of heat thus leading to an occurrence of discoloration of and lowering of the quality of the oxytetramethylene glycol copolymer. In addition, this method is only applicable to a batchwise reaction and, thus, as mentioned-above, an oxytetramethylene glycol copolymer having low glass transition temperature cannot be produced by this method.

As other methods for removing a diol from a copolymer containing an unreacted diol, there can be mentioned a method in which a diol is selectively adsorption-removed by means of an adsorbent (Unexamined Japanese Patent Application Laid-Open Specification No. Hei 9-291147), a method in which a diol is removed by extraction (Unexamined Japanese Patent Application Laid-Open Specification No. Hei 10-87813) and a method in which a diol is removed by vacuum distillation (Unexamined Japanese Patent Application Laid-Open Specification No. Hei 1-92221 (corresponding to European Patent Specification No. 305,853B)).

In the method in which a diol is removed by means of an adsorbent, the adsorbing removal ratio and breakthrough time vary depending on the type of the adsorbent used, the type and amount of the diol being adsorbed, and the like. Therefore, the type and amount of the adsorbent must be changed in accordance with the change in the conditions employed for producing an oxytetramethylene glycol copolymer. In addition, not only the unreacted diol, but also a large amount of low molecular weight oxytetramethylene glycol copolymers is adsorbed on the adsorbent, and the loss of the low molecular weight oxytetramethylene glycol copolymers becomes large. Further, for recycling the adsorbed unreacted diol, the diol must be desorbed from the adsorbent by using a solvent, such as THF. In this case, the desorption ratio also varies depending on the type and amount of the diol adsorbed on the adsorbent, and the amount of the solvent necessary for desorption varies drastically. The desorption of the adsorbed low molecular weight oxytetramethylene glycol copolymers is also accompanied by the drastic variation in the amount of the desorbed low molecular weight oxytetramethylene glycol copolymers. After the desorption of the low molecular weight oxytetramethylene glycol copolymers by a solvent, such as THF, an additional step is necessary for determining the amount of the low molecular weight oxytetramethylene glycol copolymers contained in the desorbate and specifically adjusting the copolymer concentration thereof before using the desorbed low molecular weight oxytetramethylene glycol copolymers. Therefore, this method has several problems for use in an industrial process. Further, the problems accompanying the desorption of the low molecular weight oxytramethylene glycol copolymers are known to become more difficult when the amount of the residual diol contained in the oxytetramethylene glycol copolymer decreases.

With respect to a method in which a diol is removed by extraction, Unexamined Japanese Patent Application Laid-Open Specification No. Hei 10-87813 discloses a method in which a diol is extraction-removed with water. In this method, the amount of the extraction agent (water) varies depending on the type and amount of a diol remaining in the copolymer. In addition, a polymer loss is likely to occur because an oxytetramethylene glycol copolymer occurs simultaneously with extraction-removal of a diol. In this method, by using the extraction agent in a large amount, the amount of the residual diol in the oxytetramethylene glycol copolymer can be reduced to a level which is not more than a predetermined value, but the polymer loss accompanying the extraction becomes increased. For recycling the diol extracted by this method, water used as the extraction agent must be removed by distillation. As a result, the purification process becomes disadvantageously complicated for a commercial scale production of an oxytetramethylene glycol copolymer.

Unexamined Japanese Patent Application Laid-Open Specification No. Hei 1-92221 discloses a method for removing a diol by vacuum distillation. Specifically, a diol is removed under conditions wherein the pressure is not more than 0.3 mbar, and the temperature is 200 to 260° C. Under such distillation conditions, an oxytetramethylene glycol copolymer becomes deteriorated. Further, since this method is a method for separating low molecular weight components from PTMG, when this method is used for removing a diol which is generally solidified at room temperature, the diol distilled off from the distillation apparatus becomes solidified during the subsequent cooling process, thereby causing the clogging of a condensation tube, a conduit and other components which are disposed in the vicinity of a vacuum pump. Therefore, this method is substantially inapplicable to a process in which a diol is continuously distilled off.

SUMMARY OF THE INVENTION

In this situation, the present inventors have made intensive and extensive studies for developing a novel oxytetramethylene glycol copolymer having excellent low temperature properties. As a result, it has been found that, when an oxytetramethylene glycol copolymer produced by copolymerizing THF and NPG is a relatively low molecular weight copolymer having a molecular weight of 2000 or less, the glass transition temperature becomes minimum at an NPG copolymerization ratio of approximately 10 mol %, and when the oxytetramethylene glycol copolymer produced is a relatively high molecular weight copolymer having a molecular weight of more than 2000, the glass transition temperature becomes minimum at an NPG copolymerization ratio of 5 mol % or less. This finding implies that, even with respect to a certain oxytetramethylene glycol copolymer having the same average molecular weight as that of the conventional oxytetramethylene glycol copolymer, if the NPG copolymerization ratio of the copolymer chains is specifically adjusted depending on the molecular weight of the certain copolymer, it would be possible to obtain an oxytetramethylene glycol copolymer having excellent low temperature properties due, for example, to low melting point and low glass transition temperature which properties have never been realized in the art. Further, the present inventors have found that the oxytetramethylene glycol copolymer of the present invention can be easily produced by subjecting tetrahydrofuran and neopentyl glycol to a copolymerization reaction in the presence of a heteropolyacid catalyst, while continuously removing from the reaction system water which is by-produced in the copolymerization reaction so that the amount of water is adjusted to a level wherein a two-phase reaction system is formed which comprises an organic phase comprising a solution of neopentyl glycol in tetrahydrofuran and having a neopentyl glycol concentration of from 0.05 to 3.5 weight %, based on the weight of the organic phase, and a tetrahydrofuran/aqueous heteropolyacid phase comprising a solution of an aqueous heteropolyacid catalyst in tetrahydrofuran and having a specific gravity of from 1.8 to 2.3. In addition, the present inventors have also found that, when an unreacted diol is distilled off from a reaction mixture containing an oxytetramethylene glycol copolymer and an unreacted diol in the presence of a fresh tetrahydrofuran to thereby separate and purify the oxytetramethylene glycol copolymer, it becomes possible to not only purify the copolymer without causing the clogging of a condensation tube and a conduit by the solidification of the diol, but also to recover a recyclable diol. The present invention has been completed, based on the above-mentioned findings.

Accordingly, it is an object of the present invention to provide an oxytetramethylene glycol copolymer which exhibits improved low temperature properties due, for example, to low melting point and low glass transition temperature.

It is another object of the present invention to provide a method for producing the above-mentioned oxytetramethylene glycol copolymer which exhibits improved low temperature properties.

It is still another object of the present invention to provide a method for effectively separating and purifying an oxytetramethylene glycol copolymer from a mixture containing an oxytetramethylene glycol copolymer and an unreacted diol without causing the clogging of a condensation tube and a conduit by the solidification of the diol.

The foregoing and other objects, features and advantages of the present invention will be apparent to those skilled in the art from the following detailed description and the appended claims taken in connection with the accompanying drawings.

DESCRIPTION OF REFERENCE NUMERALS

Figure 1:
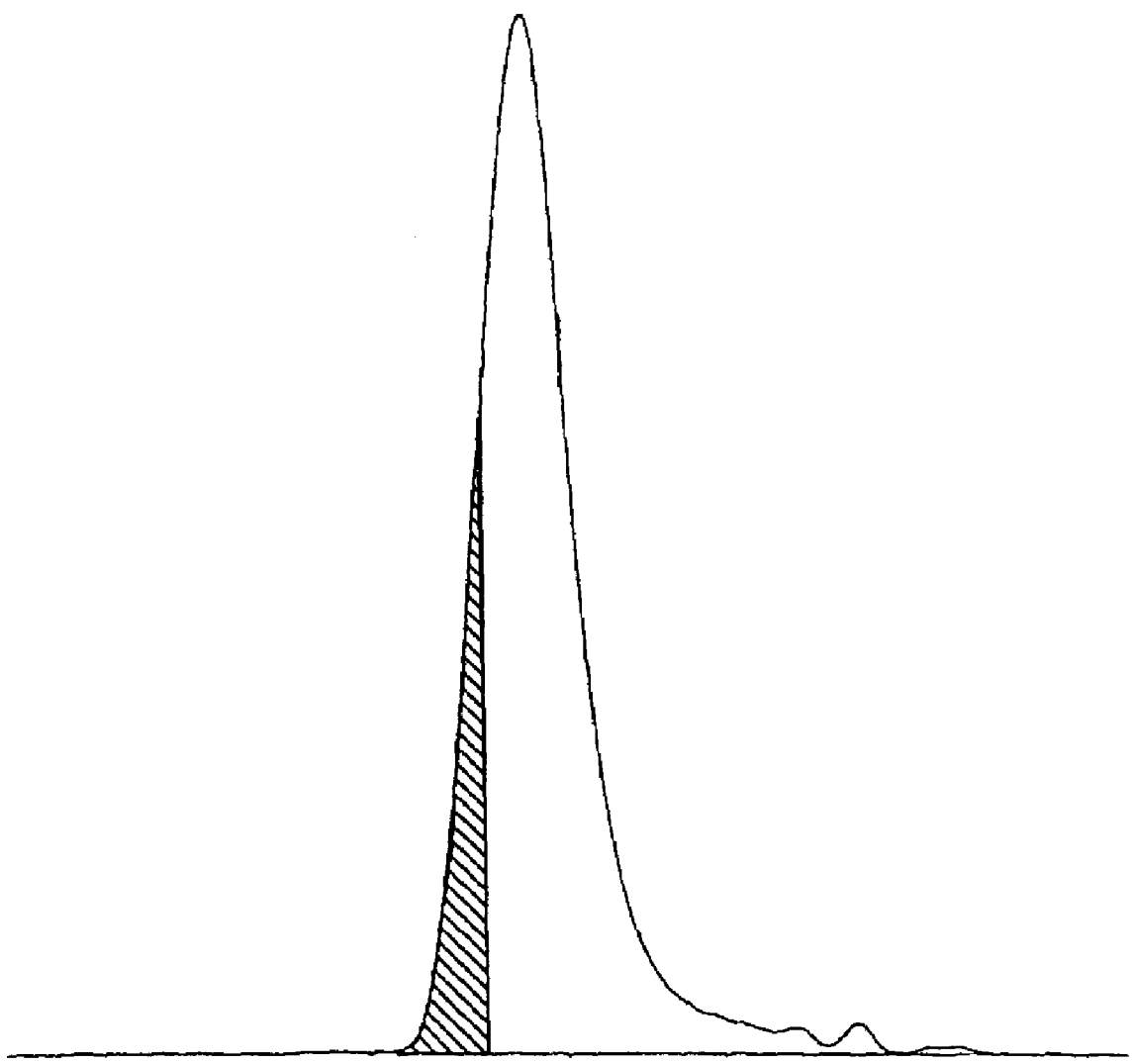
FIG. 1 shows an example of a gel permeation chromatogram of the oxytetramethylene glycol copolymer of the present invention, which illustrates the molecular weight distribution of the oxytetramethylene glycol copolymer, wherein the left-hand side is the side of the high molecular weight and the right-hand side is the side of the low molecular weight, and the hatched portion shows the high molecular weight-side 15 wt % fraction of the oxytetramethylene glycol copolymer, which fraction corresponds to the area of a part of a whole peak representing the molecular weight distribution, wherein the part is taken on the side of the high molecular weight including the maximum molecular weight in the whole peak and wherein the area of the part of the whole peak is 15%, based on the area of the whole peak.

1, 28: raw material tank
2: reactor
3: catalyst separation vessel
4: refrigerator
5: organic phase receiving vessel
6: THF tank
7, 21, 27: condensing means
8: THF/water receiving tank
9: THF/water storage tank
10-12, 14-15, 17, 24-25, 30, 34: pump
13: evaporation vessel
16: reaction mixture tank
18: mixer
19, 32: centrifugal molecular distillation apparatus
20, 26: distillation column
22: decanter
23: octane storage tank
29: fresh THF tank
31: heating means
33: oxytetramethylene glycol copolymer tank

DETAILED DESCRIPTION OF THE INVENTION

In one aspect of the present invention, there is provided an oxytetramethylene glycol copolymer, obtained by copolymerizing tetrahydrofuran and neopentyl glycol, having the following characteristics (1) to (4):

(1) a number average molecular weight Mn of from 800 to 5000;

(2) a characteristic wherein the weight average molecular weight Mw and the number average molecular weight Mn satisfy either the following (i) or the following (ii):
  (i) a molecular weight distribution of 1.8 or less in terms of the Mw/Mn ratio, or
  (ii) a molecular weight distribution of more than 1.8 in terms of the Mw/Mn ratio, wherein Mw and Mn satisfy the relationship defined by the following formula (I):

$$\frac{10^{12} \times (Mw/Mn - 1.8)^{5.95}}{\exp(Mn \times 1.2/100)} \leq 1.100; \tag{I}$$

(3) a neopentyl glycol copolymerization whole ratio $N_w$ of from 6 to 30 mol %, wherein the neopentyl glycol copolymerization whole ratio $N_w$ is defined as the molar percentage of the amount of neopentyl glycol monomer units present in the whole oxytetramethylene glycol copolymer, based on the total molar amount of the tetrahydrofuran monomer units and the neopentyl glycol units in the whole oxytetramethylene glycol copolymer; and (4) a characteristic wherein the number average molecular weight Mn, the neopentyl glycol copolymerization whole ratio $N_w$ (mol %) of the oxytetramethylene glycol copolymer, and the neopentyl glycol copolymerization partial ratio $N_h$ (mol %) of a high molecular weight-side 15 wt % fraction of the oxytetramethylene glycol copolymer satisfy the relationship defined by the following formula (II):

$$N_h/N_w^{1.11}/Mn^{0.3} < 0.0560 \quad (II),$$

wherein $N_h$ is defined as the molar percentage of the amount of neopentyl glycol monomer units present in the high molecular weight-side 15 wt % fraction, based on the total molar amount of the tetrahydrofuran monomer units and the neopentyl glycol units in the high molecular weight-side 15 wt % fraction, wherein the high molecular weight-side 15 wt % fraction is a fraction of the oxytetramethylene glycol copolymer, which fraction corresponds to the area of a part of a whole peak representing the molecular weight distribution over the whole range of from a low molecular weight to a high molecular weight in a gel permeation chromatogram of the oxytetramethylene glycol copolymer, wherein the part is taken on the side of the high molecular weight including the maximum molecular weight in the whole peak and wherein the area of the part of the whole peak is 15%, based on the area of the whole peak.

In another aspect of the present invention, there is provided a method for producing the oxytetramethylene glycol copolymer of claim 1, which comprises:

subjecting tetrahydrofuran and neopentyl glycol to a copolymerization reaction in the presence of a heteropolyacid catalyst, the copolymerization reaction being continuously performed in the presence of water in a continuous copolymerization reactor while continuously feeding tetrahydrofuran and neopentyl glycol to the continuous copolymerization reactor and while continuously removing water which is by-produced in the copolymerization reaction so that the amount of water is adjusted to a level wherein a two-phase reaction system is formed which comprises an organic phase comprising a solution of neopentyl glycol in tetrahydrofuran and having a neopentyl glycol concentration of from 0.05 to 3.5 weight %, based on the weight of the organic phase, and a tetrahydrofuran/aqueous heteropolyacid phase comprising a solution of an aqueous heteropolyacid catalyst in tetrahydrofuran and having a specific gravity of from 1.8 to 2.3, wherein the continuous copolymerization reaction is continued while maintaining the two-phase reaction system, to thereby form a copolymerization reaction mixture comprising a reaction-formed organic phase containing an oxytetramethylene glycol copolymer having a number average molecular weight of from 800 to 5000 and a reaction-formed tetrahydrofuran/aqueous heteropolyacid phase;

separating the reaction-formed organic phase containing the oxytetramethylene glycol copolymer from the copolymerization reaction mixture; and separating and purifying the oxytetramethylene glycol copolymer from the reaction-formed organic phase.

Hereinbelow, the present invention will be described in more detail.

The oxytetramethylene glycol copolymer of the present invention is an oxytetramethylene glycol copolymer, which is obtained by copolymerizing tetrahydrofuran and neopentyl glycol and which has the following characteristics (1) to (4):

(1) a number average molecular weight Mn of from 800 to 5000;

(2) a characteristic wherein the weight average molecular weight Mw and the number average molecular weight Mn satisfy either the following (i) or the following (ii):
  (i) a molecular weight distribution of 1.8 or less in terms of the Mw/Mn ratio, or
  (ii) a molecular weight distribution of more than 1.8 in terms of the Mw/Mn ratio, wherein Mw and Mn satisfy the relationship defined by the following formula (I):

$$\frac{10^{12} \times (Mw/Mn - 1.8)^{5.95}}{\exp(Mn \times 1.2/100)} \leq 1.100; \quad (I)$$

(3) a neopentyl glycol copolymerization whole ratio $N_w$ of from 6 to 30 mol %, wherein the neopentyl glycol copolymerization whole ratio $N_w$ is defined as the molar percentage of the amount of neopentyl glycol monomer units present in the whole oxytetramethylene glycol copolymer, based on the total molar amount of the tetrahydrofuran monomer units and the neopentyl glycol units in the whole oxytetramethylene glycol copolymer; and (4) a characteristic wherein the number average molecular weight Mn, the neopentyl glycol copolymerization whole ratio $N_w$ (mol %) of the oxytetramethylene glycol copolymer, and the neopentyl glycol copolymerization partial ratio $N_h$ (mol %) of a high molecular weight-side 15 wt % fraction of the oxytetramethylene glycol copolymer satisfy the relationship defined by the following formula (II):

$$N_h/N_w^{1.11}/Mn^{0.3} < 0.0560 \quad (II),$$

wherein $N_h$ is defined as the molar percentage of the amount of neopentyl glycol monomer units present in the high molecular weight-side 15 wt % fraction, based on the total molar amount of the tetrahydrofuran monomer units and the neopentyl glycol units in the high molecular weight-side 15 wt % fraction, wherein the high molecular weight-side 15 wt % fraction is a fraction of the oxytetramethylene glycol copolymer, which fraction corresponds to the area of a part of a whole peak representing the molecular weight distribution over the whole range of from a low molecular weight to a high molecular weight in a gel permeation chromatogram of the oxytetramethylene glycol copolymer, wherein the part is taken on the side of the high molecular weight including the maximum molecular weight in the whole peak and wherein the area of the part of the whole peak is 15%, based on the area of the whole peak.

The copolymer of the present invention is composed of THF and NPG and contains tetramethylene ether bonds. Such a copolymer is obtained by a complicated reaction mode which involves a simultaneous occurrence of multiple reactions, such as a living cationic polymerization of THF, a termination reaction of the living cationic polymerization by the hydroxyl group of NPG, and a copolymerization reaction comprising a dehydration condensation between a hydroxyl group of a terminal THF unit and a hydroxyl group of either a terminal NPG unit or NPG monomer. Specifically, in the final oxytetramethylene glycol copolymer, a high molecular weight polymer chain is likely to contain a long THF homopolymer region and a middle to a low molecular weight polymer chain is likely to contain a short THF homopolymer region. Therefore, the molecular weight distribution of all polymer chains of the whole oxytetramethylene glycol copolymer reflects the length of the THF homopolymer region. Accordingly, even when the molecular weight of a certain copolymer chain is twice as large as that of another, the molar amount of NPG monomer units contained in the copolymer chain becomes smaller than the twice molar amount.

The number average molecular weight Mn of the oxytetramethylene glycol copolymer of the present invention is of from 800 to 5,000, preferably from 900 to 3,000. When the number average molecular weight of the copolymer is less than 800, such a copolymer exhibits improved low temperature properties due, for example, to a low melting point and a low glass transition temperature; however, an elastic product having desired excellent properties cannot be obtained by using such too small a number average molecular weight oxytetramethylene glycol copolymer as a raw material. Further, when the number average molecular weight of the copolymer is more than 5,000, for obtaining a copolymer having a melting point which is less than room temperature, the neopentyl glycol (NPG) copolymerization ratio of the whole oxytetramethylene glycol copolymer must become higher than 30 mol %. However, as explained below, when the NPG copolymerization ratio of a copolymer exceeds 30 mol %, the effect obtained by adjusting the NPG copolymerization ratio depending on the molecular weight range becomes small.

Further, the oxytetramethylene glycol copolymer of the present invention includes both a copolymer molecule having a molecular weight distribution of 1.8 or less in terms of the Mw/Mn ratio and a copolymer molecule having a molecular weight distribution of more than 1.8 in terms of the Mw/Mn ratio, wherein Mw represents the weight average molecular weight of the copolymer and Mn represents the number average molecular weight of the copolymer. With respect to the copolymer molecule having a molecular weight distribution of 1.8 or less, it is preferred that the molecular weight distribution is narrow as possible. Specifically, it is preferred that the molecular weight distribution is 1.7 or less in the case of the copolymer having a molecular weight distribution of less than 1.8. Such a narrow molecular weight distribution results in a decrease in an amount of the high molecular weight polymer chains which have very high molecular weight as compared to the average molecular weight. The presence of high molecular weight polymer chains adversely affects the low temperature properties of the copolymer and, thus, the decrease in the amount of the high molecular weight polymer chains leads to an improvement in the low temperature properties of the whole copolymer.

However, even when the molecular weight distribution of the copolymer is more than 1.8, a copolymer which satisfies the relationship defined by the following formula (I) falls within the scope of the present invention:

$$\frac{10^{12} \times (Mw/Mn - 1.8)^{5.95}}{\exp(Mn \times 1.2/100)} \leq 1.100. \quad (I)$$

The index represented by formula (I) above (hereinafter, frequently referred to as "index α") shows a relationship between the number average molecular weight and the weight average molecular weight, and it implies that the molecular weight distribution may be broadened slightly when the number average molecular weight of the copolymer is high. This is because the effect of the narrow molecular weight distribution on the improvement in the low temperature properties becomes small in the case of a copolymer having a relatively large number average molecular weight. In other words, a copolymer fraction having a relatively small number average molecular weight exerts a high level of the above-mentioned improvement in the low temperature properties, which is achieved by the narrow molecular weight distribution (i.e., the presence of high molecular weight molecules in a small amount), but the high molecular weight fraction exerts only a low level of the improvement in the low temperature properties as compared to that of the low molecular weight fraction.

In the present invention, index α is not more than 1.100, preferably not more than 0.800, more preferably not more than 0.500. When a copolymer has a broad molecular weight distribution such that index α exceeds 1.100, such a copolymer contains polymer chains having a very high molecular weight. In this case, even when the number average molecular weight is high, the low temperature properties of the copolymer are lowered by the adverse effects of the polymer chains having a very high molecular weight.

The neopentyl glycol copolymerization whole ratio $N_w$ of the oxytetramethylene glycol copolymer of the present invention is from 6 to 30 mol %, preferably from 9 to 25 mol %. The neopentyl glycol copolymerization whole ratio (NPG copolymerization whole ratio) $N_w$ is defined as the molar percentage of the amount of neopentyl glycol monomer units present in the whole oxytetramethylene glycol copolymer, based on the total molar amount of the tetrahydrofuran monomer units and the neopentyl glycol units in the whole oxytetramethylene glycol copolymer. In the present invention, $N_w$ is measured by means of $^1$H-NMR. Specifically, the $N_w$ value is calculated from the integral value of the methylene protons of methylene groups of a THF chain having methylene groups at both terminals thereof and the integral value of the methyl protons of NPG.

When the NPG copolymerization whole ratio is less than 6 mol %, the copolymerization effect becomes low, and a copolymer having a number average molecular weight of 2,000 or more takes a solid form at room temperature. In other words, the melting point of such a copolymer becomes higher than room temperature (20° C.). The term "copolymerization effect" used in the present invention is defined as the lowering in the melting point which is achieved by the copolymerization of THF with a comonomer, wherein not only is the regularity of the THF homopolymer chain eliminated, but a lowering in the intermolecular interaction of the polymer chains is also caused. On the other hand, when the NPG copolymerization whole ratio is more than 30 mol %, such a copolymer no longer exhibits the above-mentioned copolymerization effect obtained by adjusting the NPG copolymerization ratio depending on each molecular weight range.

The melting point of an oxytetramethylene glycol copolymer can be lowered by increasing the NPG copolymerization whole ratio, and a copolymer having an NPG copolymerization whole ratio of 20 mol % or more no longer exhibits a melting point. When the NPG copolymerization whole ratio is less than 20 mol %, the melting point of an oxytetramethylene glycol copolymer is elevated in accordance with an increase of the molecular weight. Further, the glass transition temperature becomes minimum at a point in the vicinity of from 3 to 20 mol % in terms of NPG copolymerization whole ratio. This minimization point varies depending on the molecular weight of the copolymer, and the minimization point is lowered in accordance with the increase of the molecular weight. In view of these properties, for lowering the melting point and glass transition temperature of an oxytetramethylene glycol copolymer, the NPG copolymerization whole ratio of the oxytetramethylene glycol copolymer must be 6 mol % or more.

In addition, the oxytetramethylene glycol copolymer of the present invention has not only an NPG copolymerization whole ratio within the above-mentioned range, but also different NPG copolymerization ratios in the low molecular weight-side fraction and in the high molecular weight-side fraction. The present inventors have made an extensive and intensive study for producing an oxytetramethylene glycol copolymer having improved low temperature properties and have found that, with respect to those relatively low molecular weight copolymers which have a molecular weight of 2,000 or less, the glass transition temperature becomes minimum at an NPG copolymerization ratio of approximately 10 mol %, and with respect to those relatively high molecular weight copolymers which have a molecular weight of more than 2,000, the glass transition temperature becomes minimum at a point within the range of 5 mol % or less in terms of an NPG copolymerization ratio. This finding implies that, even with respect to a certain oxytetramethylene glycol copolymer having the same average molecular weight as that of the conventional oxytetramethylene glycol copolymer, if the NPG copolymerization ratio of each molecular weight fraction is specifically adjusted, it would be possible to produce an oxytetramethylene glycol copolymer having a low melting point and a low glass transition temperature which have never been achieved in the art. As a result of the specific adjustment of the NPG copolymerization ratio of each molecular weight fraction, the oxytetramethylene glycol copolymer of the present invention has a characteristic wherein the number average molecular weight Mn, the neopentyl glycol copolymerization whole ratio $N_w$ (mol %) of the oxytetramethylene glycol copolymer, and the neopentyl glycol copolymerization partial ratio $N_h$ (mol %) of a high molecular weight-side 15 wt % fraction of the oxytetramethylene glycol copolymer satisfy the relationship defined by the following formula (II):

$$N_h/N_w^{1.11}/Mn^{0.3} < 0.0560 \quad \text{(II)},$$

wherein $N_h$ is defined as the molar percentage of the amount of neopentyl glycol monomer units present in the high molecular weight-side 15 wt % fraction, based on the total molar amount of the tetrahydrofuran monomer units and the neopentyl glycol units in the high molecular weight-side 15 wt % fraction.

In the present invention, the "high molecular weight-side 15 wt % fraction" is a fraction of the oxytetramethylene glycol copolymer, which fraction corresponds to the area of a part of a whole peak representing the molecular weight distribution over the whole range of from a low molecular weight to a high molecular weight in a gel permeation chromatogram of the oxytetramethylene glycol copolymer, wherein the part is taken on the side of the high molecular weight including the maximum molecular weight in the whole peak and wherein the area of the part of the whole peak is 15%, based on the area of the whole peak. The high molecular weight-side 15 wt % fraction is obtained empirically by preparative gel permeation chromatography (GPC). Specifically, the molecular weight fractionation of the copolymer molecules is performed by utilizing the difference in retention time, and the high molecular weight-side 15 wt % fraction is obtained by recovering a fraction which corresponds to a part of a whole peak in a gel permeation chromatogram of the oxytetramethylene glycol copolymer, wherein the part is taken on the side of the high molecular weight including the maximum molecular weight in the whole peak and wherein the area of the part of the whole peak is 15%, based on the area of the whole peak.

An example of a gel permeation chromatogram of the oxytetramethylene glycol copolymer of the present invention is shown in FIG. 1. In FIG. 1, the left-hand side is the side of the high molecular weight and the right-hand side is the side of the low molecular weight, and the hatched portion shows the high molecular weight-side 15 wt % fraction. There is no particular limitation to the method for obtaining the gel permeation chromatogram, but a preparative gel permeation chromatography was performed in the present invention. The conditions employed in the present invention for performing a preparative GPC are shown below.

Apparatus: LC-908 (manufactured and sold by Japan Analytical Industry Co., Ltd., Japan)

Columns: Shodex H2001 and H2002 are used when the number average molecular weight is less than 3,000, and Shodex H2001, H2002 and H2002.5 are used when the number average molecular weight is 3,000 or more (each manufactured and sold by Showa Denko K. K., Japan);

Detector: Differential refractometer (RI);

Temperature: 40° C.;

Eluent: chloroform

Flow rate of the eluent: 3 ml/min;

Sample: chloroform solution containing 3 wt % of a copolymer;

Amount of the injected sample: 3 ml;

Sampling number for fractions: 5; and

Sampling interval for fractions: 10 sec.

After obtaining a chromatogram by GPC under the above-mentioned conditions, the fractions on the high molecular weight side are collected so that the total area of the fractions corresponds to 15% of the area of the whole peak representing the molecular weight distribution over the whole range of from a low molecular weight to a high molecular weight. Chloroform is distilled off from the collected fraction at 60° C. under 5 Torr to thereby by obtain a high molecular weight-side 15 wt % fraction, and the NPG copolymerization ratio of the obtained high molecular weight-side 15 wt % fraction is analyzed by $^1$H-NMR in the same manner as mentioned above.

The abscissa of a chromatogram obtained by a preparative GPC, such as mentioned above, indicates the retention time, wherein it should be noted that the abscissa of a chromatogram obtained by an analytical GPC indicates a logarithm of the molecular weight. Comparison of these two types of chromatograms may reveal the absence of linearity between the retention time and the logarithm of the molecular weight at the high molecular weight side of the chromatograms. As a result, the abscissa of an ordinary GPC chromatogram showing the molecular weight distribution is sometimes extended on the high molecular weight side thereof. Further, a difference is observed in the molecular weight distribution due to the difference in the preciseness of the columns used for GPC. However, the measurement result of a preparative GPC and the measurement result of an analytical GPC become substantially the same when high performance columns, such as those which are used in the present invention, are employed. Therefore, although the high molecular weight-side 15 wt % fraction is recovered by a preparative GPC in the present invention, it is considered that the recovered high molecular weight-side 15 wt % fraction is substantially the same as a fraction of the oxytetramethylene glycol copolymer obtained by an analytical GPC, which fraction corresponds to the area of a part of a whole peak representing the molecular weight distribution over the whole range of from a low molecular weight to a high molecular weight in a gel permeation chromatogram of the oxytetramethylene glycol copolymer, wherein the part is taken on the side of the high molecular weight including the maximum molecular weight in the whole peak and wherein the area of the part of the whole peak is 15%, based on the area of the whole peak. In the present invention, the preparative GPC was performed using LG-908 (manufactured and sold by Japan Analytical Industry Co., Ltd., Japan) as a GPC apparatus and Shodex H2001, H2002 and H2002.5 (each manufactured and sold by Showa Denko K. K., Japan) as columns, and the analytical GPC was performed using HLC-8220 GPC (manufactured and sold by Tosoh Corporation, Japan) as a GPC apparatus and TSKgel SuperH3000, TSKgel SuperH2000 and TSKgel SuperH1000 (manufactured and sold by Tosoh Corporation, Japan) as columns.

In formula (II) above, $N_h$ which is the molar percentage of the amount of neopentyl glycol monomer units present in the high molecular weight-side 15 wt % fraction has a large influence on the glass transition temperature of the whole copolymer. In the polymer chains having high molecular weights, the glass transition temperature becomes minimum when the NPG copolymerization ratio becomes relatively low. Therefore, the glass transition temperature of the whole copolymer can be lowered by decreasing the NPG copolymerization ratio of the high molecular weight copolymer chains.

The index represented by formula (II) above (hereinafter, frequently referred to as "index $\beta$") is an empirical formula obtained by the present inventors, and it is preferred that the index $\beta$ is as low as possible. However, in practice, it is technically difficult to produce a copolymer having a $\beta$ value of less than 0.035.

The oxytetramethylene glycol copolymer of the present invention having all of the above-mentioned characteristics (1) to (4) exhibits improved low temperature properties and can be advantageously used for producing elastic products having excellent properties.

The method for producing the oxytetramethylene glycol copolymer of the present invention which has improved low temperature properties is explained in detail below.

The method for producing the oxytetramethylene glycol copolymer of the present invention comprises:

subjecting tetrahydrofuran and neopentyl glycol to a copolymerization reaction in the presence of a heteropolyacid catalyst, the copolymerization reaction being continuously performed in the presence of water in a continuous copolymerization reactor while continuously feeding tetrahydrofuran and neopentyl glycol to the continuous copolymerization reactor and while continuously removing water which is by-produced in the copolymerization reaction so that the amount of water is adjusted to a level wherein a two-phase reaction system is formed which comprises an organic phase comprising a solution of neopentyl glycol in tetrahydrofuran and having a neopentyl glycol concentration of from 0.05 to 3.5 weight %, based on the weight of the organic phase, and a tetrahydrofuran/aqueous heteropolyacid phase comprising a solution of an aqueous heteropolyacid catalyst in tetrahydrofuran and having a specific gravity of from 1.8 to 2.3, wherein the continuous copolymerization reaction is continued while maintaining the two-phase reaction system, to thereby form a copolymerization reaction mixture comprising a reaction-formed organic phase containing an oxytetramethylene glycol copolymer having a number average molecular weight of from 800 to 5000 and a reaction-formed tetrahydrofuran/aqueous heteropolyacid phase;

separating the reaction-formed organic phase containing the oxytetramethylene glycol copolymer from the copolymerization reaction mixture; and separating and purifying the oxytetramethylene glycol copolymer from the reaction-formed organic phase.

Tetrahydrofuran (THF) and neopentyl glycol (NPG) are raw materials for the oxytetramethylene glycol copolymer of the present invention. The copolymer of the present invention is composed of these two monomers, but it may contain a small amount of other ether type comonomers. Examples of other comonomers include 3-methyl-tetrahydrofuran, 1,2-propylene oxide, 3-methyl-oxetane and the like. In such an oxytetramethylene glycol copolymer, the copolymerization ratio of a comonomer other than NPG is the same as that of NPG, namely 6 to 30 mol %.

The heteropolyacid used as a polymerization catalyst in the present invention is an acid obtained by the condensation of an oxide of at least one metal species selected from the group consisting of molybdenum (Mo), tungsten (W) and vanadium (V), and an oxyacid of other elements, such as phosphorus (P), silicon (Si), arsenic (As), germanium (Ge), boron (B), titanium (Ti), cerium (Ce) and cobalt (Co). The atomic ratio of the metal species (any one or more of metals selected from the group consisting of Mo, W and V) contained in the heteropolyacid to other elements in the heteropolyacid is 2.5 to 12.

The heteropolyacid may be in the form of a BrØnsted acid or a salt thereof. Specific examples of heteropolyacids and salts thereof include phosphomolybdic acid, phosphotungstic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovanadic acid, germanotungstic acid, borotungstic acid, boromolybdic acid, boromolybdotungstic acid, boromolybdovanadic acid, boromolybdotungstovanadic acid, cobaltmolbdic acid, cobalttungstic acid, arsenomolybdic acid, arsenotungstic acid, titanomolybdic acid and ceromolybdic acid, and metal salts thereof. A preferred heteropolyacid is an oxyacid obtained by the condensation of an oxide of at least one metal species selected from the group consisting of Mo and W, and an oxyacid of at least one element selected from P and Si.

In the present invention, the copolymerization reaction is continuously performed in the presence of water in a continuous copolymerization reactor while continuously feeding tetrahydrofuran and neopentyl glycol to the continuous copolymerization reactor and while continuously removing water which is by-produced in the copolymerization reaction so that the amount of water is adjusted to a level wherein a two-phase reaction system is formed. The two-phase reaction system comprises an organic phase comprising a solution of neopentyl glycol in tetrahydrofuran and having a neopentyl glycol concentration of from 0.05 to 3.5 weight %, based on the weight of the organic phase, and a tetrahydrofuran/aqueous heteropolyacid phase (hereinafter, frequently referred to simply as a "catalyst phase") comprising a solution of an aqueous heteropolyacid catalyst in tetrahydrofuran and having a specific gravity of from 1.8 to 2.3.

In general, an anhydrous heteropolyacid is sparingly soluble in an anhydrous THF, but well soluble in a mixed solvent prepared by adding a small amount of water to THF. Water, THF and a heteropolyacid can be mixed together while adjusting the amounts of water, THF and heteropolyacid to values within their respective ranges wherein the resultant mixture becomes a heteropolyacid solution, to thereby obtain a catalyst phase having a specific gravity of from 1.8 to 2.3.

The reason why the reaction system used in the present invention separates into two phases, namely an organic phase and a catalyst phase, is not fully elucidated, but it is considered that a small amount of water is coordinated to the heteropolyacid.

When the specific gravity of the catalyst phase is less than 1.8, the polymerization rate is markedly lowered and the retention time in the polymerization reactor becomes markedly long. As a result, the produced oxytetramethylene glycol copolymer has a broad molecular weight distribution and exhibits a high glass transition temperature. Accordingly, it is preferred that the catalyst phase has a high specific gravity, especially a specific gravity of 1.9 or more. However, when the specific gravity of the catalyst phase exceeds 2.3, a part of the heteropolyacid catalyst contained in the catalyst phase precipitates and the catalyst phase becomes a slurry. The precipitated (solidified) heteropolyacid catalyst moves rapidly between the catalyst phase and the organic phase, thereby causing the catalytic activity in the organic phase to become high. As a result, it becomes difficult to produce a copolymer having a narrow molecular weight distribution which is obtained by the use of a catalyst in the liquid state. In addition, since only the acidic groups at the surface of the solid heteropolyacid exhibit a catalytic activity, the precipitation of a large amount of a solid heteropolyacid causes the number of effective acid groups to be decreased, leading to a lowering of the reaction rate.

There is a correlation between the specific gravity of the catalyst phase in the reaction system and the amount of water coordinated to a heteropolyacid. When the catalyst phase is produced using a heteropolyacid in which the amount of water coordinated thereto is 6 moles per mole of the heteropolyacid, the specific gravity of the catalyst phase at room temperature becomes 1.6 to 1.7. Therefore, in order to obtain a catalyst phase having a specific gravity of 1.8 or more, the amount of water coordinated to the heteropolyacid must be less than 6 moles per mole of the heteropolyacid. It should noted that the specific gravity of the catalyst phase is not determined solely by the amount of water coordinated to the heteropolyacid, and that the specific gravity of the catalyst phase is also influenced by the amount of NPG contained in the reaction system and the temperature of the reaction system. In any case, under the polymerization conditions employed in the present invention, for obtaining a catalyst phase having a specific gravity of 1.8 or more, the amount of water coordinated to the heteropolyacid must be less than 6 moles per mole of the heteropolyacid.

In the present invention, the NPG concentration of the organic phase is maintained at 0.05 to 3.5 wt %. Hereinbelow, the effects of maintaining the NPG concentration of the organic phase at a constant value is explained in detail.

In the polymerization reaction of the present invention, polymers are elongated by a complicated reaction mode which involves a simultaneous occurrence of multiple reactions, such as a living cationic polymerization of THF, a termination reaction of the living cationic polymerization by the hydroxyl group of NPG, and a copolymerization reaction comprising a dehydration condensation between a hydroxyl group of a terminal THF unit and a hydroxyl group of either a terminal NPG unit or an NPG monomer. When the polymerization reaction is performed under conditions wherein a polymer chain consisting of THF (that is, the region in the copolymer which consists of THF (THF homopolymer region)), which is produced by the living cationic polymerization, has a broad molecular weight distribution, the final oxytetramethylene glycol copolymer contains a high molecular weight polymer chain having a long THF homopolymer region and a middle to a low molecular weight polymer chain having a short THF homopolymer region. Therefore, the molecular weight distribution of the whole oxytetramethylene glycol copolymer reflects the length of the THF homopolymer region, and the polymer chains having different molecular weights will contain substantially the same molar amount of NPG.

For producing a copolymer having the abovementioned composition, it is necessary to selectively perform the living cationic polymerization of THF. Specifically, the above-mentioned copolymer is obtained only by maintaining the NPG concentration of the organic phase at a constant value in the range of from 0.05 to 3.5 wt %. It is considered that an appropriate amount of NPG functions as a surfactant for the THF homopolymer in the catalyst phase, and this enables a long THF homopolymer to reside in the catalyst phase.

The NPG concentration of the organic phase must be maintained within the range of from 0.05 to 3.5 wt %, and it is preferred that the NPG concentration is of from 0.1 to 2 wt %, more preferably from 0.1 to 1 wt %. When the NPG concentration is maintained within the above-mentioned range, there is a relative decrease in the NPG copolymerization ratio of the high molecular weight polymer chains. When the NPG concentration of the organic phase is less than 0.05 wt %, it is impossible to produce an oxytetramethylene glycol copolymer having an NPG copolymerization ratio of 6 mol % or more and, thus, the produced oxytetramethylene glycol copolymer exhibits high melting point and high glass transition temperature.

On the other hand, when the NPG concentration of the organic phase is 3.5 wt % or more, NPG significantly causes the termination of the living cationic polymerization of THF, and only polymer chains having a very short THF polymer region are produced. As a result, the molecular weight distribution of the THF homopolymer region becomes very narrow, and the NPG copolymerization ratio of the high molecular weight polymer chains in the molecular weight distribution of the oxytetramethylene glycol copolymer becomes relatively high. As explained above, in the high molecular weight polymer chains, the glass transition temperature becomes minimum when the NPG copolymerization ratio is relatively low, and the glass transition temperature of the whole oxytetramethylene glycol copolymer can be lowered by decreasing the NPG copolymerization ratio of the high molecular weight polymer chains.

In the method of the present invention, water which is by-produced during the copolymerization reaction is removed from the continuous copolymerization reactor. In a continuous reaction, when the by-produced water is not removed from the reaction system, the amount of water contained in the reaction system increases and lowers the specific gravity of the catalyst phase, thereby causing the organic phase and the catalyst phase to become uniform (that is, the reaction system forms a single-phase reaction system instead of a two-phase reaction system). Therefore, water by-produced during the copolymerization reaction must be removed from the reaction system so as to maintain the specific gravity of the catalyst phase at a constant value.

Hereinbelow, an explanation is made on a method for removing water by-produced during the copolymerization reaction.

Since the method of the present invention comprises a continuous copolymerization reaction, the by-produced water must be removed continuously from the reaction system. The method employed in the present invention for removing water from the reaction system is a method in which water and THF are azeotropically distilled off from the reaction system and THF is returned to the reaction mixture in an amount which is equivalent to the amount of THF removed by the azeotropic distillation. In this case, the azeotropic distillation of water and THF may be performed by using the system shown in FIG. 2, wherein the gaseous phase containing the azeotropic vapor is withdrawn from the reaction system or, alternatively, by using the system shown in FIG. 3, wherein the reaction system is separated into the organic phase and the catalyst phase, followed by the withdrawal of the azeotropic vapor of water and THF.

In the method in which water and THF are removed by azeotropic distillation from a reaction system containing both the organic phase and the catalyst phase, since the mol fraction of water in the catalyst phase is higher than the mol fraction of water in the organic phase, the mol fraction of water in the total of the organic phase and the catalyst phase is higher than the mol fraction of the organic phase. Therefore, this method is considered to exhibit a higher water removal efficiency than a method in which an organic phase is separated from a catalyst phase and water is removed from the separated organic phase. Further, in this method, a lowering of the inner pressure of the reactor so as to lower the boiling point of water is effective for improving the water withdrawal rate. However, when water in the reaction system comprising both the organic phase and the catalyst phase is removed with THF by azeotropic distillation, a precise control of the reaction temperature may become difficult when the water removal is performed at a high reaction rate such that the latent heat of vaporization necessary for the azeotropic distillation adversely affects the reaction temperature.

For removing water while maintaining the stable polymerization reaction conditions, it is preferred that the reaction system is separated into the organic phase and the catalyst phase and, then, the azeotropic mixture of water and THF is withdrawn from the organic phase. In this method, it is preferred that a part of the organic phase withdrawn from the reaction system is returned to the reaction system so as to achieve a predetermined retention time.

In the present invention, the copolymerization reaction proceeds in a two-phase reaction system comprising an organic phase and a catalyst phase, and most of the copolymerization reaction proceeds in the catalyst phase. For increasing the reaction rate, it is necessary to increase the efficiency of contact between the organic phase containing THF and NPG which are the raw material monomers and the catalyst phase which is the polymerization reaction site. In the present invention, the reaction rate is increased by appropriately controlling the shape of the reactor and the efficiency of agitation so as to improve the efficiency of contact.

Hereinbelow, an explanation is made with respect to the shape of the continuous polymerization reactor and the efficiency of agitation.

The continuous polymerization reactor used in the present invention may be or may not be equipped with a baffle on the inner wall of the reactor. It is preferred that the polymerization reactor is equipped with a baffle. With respect to the liquid contents in the polymerization reactor, the L/D value (wherein L represents the depth of the liquid contents in the polymerization reactor and D represents the diameter of the polymerization reactor) is preferably in the range of from 0.5 to 10, more preferably from 1 to 3.

There is no particular limitation with respect to the morphology of the impeller. For example, the impeller is selected from an anchor impeller, a turbine, a propeller, a plane blade puddle, a curved blade puddle, a Pfaudler type impeller, and a Bulmarzin type impeller, preferably from an anchor impeller, a turbine, a propeller and puddles. The impellers may have an angled blade or a pitched blade. The width of the blades greatly varies depending on the type (morphology) of the impeller, and is not particularly limited. The number of the blades attached to the shaft of the impeller is generally from 1 to 10, usually from 1 to 3. However, an impeller having more than ten blades and an impeller having only one blade can be used without causing any problem. With respect to the size of the impeller, it is preferred that the value d/D (wherein d represents the diameter of the blade of the impeller, which is twice as long as the length of the blade of the impeller; and D represents the diameter of the polymerization reactor) is from 0.1 to 0.95, preferably from 0.3 to 0.8. The preferred range of the revolution speed of the stirrer greatly varies depending on the structure of the impeller. Therefore, the revolution speed of the stirrer is controlled in accordance with the structures of the reactor and impeller so as to give a motive power (P) within the desired range. Basically, it is preferred that the impeller has a structure such that a large motive power is obtained by a slow revolution speed.

One method for improving the agitation efficiency of the polymerization reactor is to increase the motive power. Excellent agitation efficiency is achieved when the motive power (P/V) applied to the liquid per unit volume thereof {wherein P represents the motive power (kW) applied to the liquid in the reactor and V represents the volume ($m^3$) of the liquid in the reactor} is 0.1 or more. Since an increase of the P/V value results in an increase of the reaction rate, it is preferred to make the P/V value as large as possible. However, no further improvement is achieved even when the P/V value becomes larger than 6.

Further, for improving the agitation efficiency of the reaction system, it is preferred that the ratio of the volume of the catalyst phase to the volume of the liquid in the reactor (CV/V) {wherein CV represents the volume of the catalyst phase in the reactor and V represents the volume of the liquid in the reactor} is from 0.1 to 0.9. In the continuous polymerization reaction of the present invention, when the CV/V value is high, a satisfactory polymerization reaction can be achieved even when the retention time (V/F) of the raw material monomers (THF and NPG) in the reactor {wherein V represents the volume ($m^3$) of the liquid in the reactor and F represents the rate ($m^3$/hour) of feeding the raw materials to the reactor} is small.

In the method of the present invention for producing an oxytetramethylene glycol copolymer, the amount of oxygen present in the reaction system is suppressed to a level as low as possible for preventing the discoloration of the oxytetramethylene glycol copolymer which is caused by the presence of oxygen during the polymerization reaction. Specifically, the oxygen concentration of the reaction system is preferably 1000 ppm or less, and the low oxygen concentration can be achieved by performing the polymerization reaction in an atmosphere of an inert gas, such as nitrogen gas, helium gas, argon gas and neon gas.

A copolymerization reaction mixture obtained in the above-mentioned manner can be left still after the termination of the polymerization reaction to thereby effect a phase separation of the reaction mixture into a reaction-formed organic phase containing the oxytetramethylene glycol copolymer and a catalyst phase, and only the reaction-formed organic phase can be recovered to thereby remove a large part of the polymerization catalyst contained in the reaction mixture. However, since the reaction-formed organic phase contains unreacted raw material monomers and a small amount of the catalyst, it is preferred that further separation and purification of the copolymer is performed. There is no particular limitation to the method for separating and purifying the copolymer and the copolymer can be purified by any conventional method. For example, use can be made of a purification method employed in the prior art, such as Unexamined Japanese Patent Application Laid-Open Specification Nos. Sho 60-203633, Sho 61-120830, Sho 61-123630, Hei 6-87951, Hei 9-291147, Hei 10-87811, Hei 10-87812 and Hei 10-87813.

Hereinbelow, an explanation is made on one example of a purification process which can be performed after producing a copolymer by the method of the present invention.

The organic phase which is separated from the catalyst phase is subjected to distillation to thereby remove a portion of THF remaining in the organic phase. It is preferred that the temperature for distilling off THF is in the range of from 40 to 100° C. Since a small amount of the polymerization catalyst is also dissolved in the organic phase, the exposure of the organic phase to high temperatures for a long time may cause problems, such as depolymerization of a THF terminal of the oxytetramethylene glycol copolymer, and incorporation of the unreacted NPG into the oxytetramethylene glycol copolymer by the dehydration condensation between a part of the unreacted NPG and the oxytetramethylene glycol copolymer. Therefore, the distillation of THF is preferably performed at a relatively low temperature which is not higher than 70° C., more preferably 50 to 60° C. Further, an optimum range of the distillation pressure may slightly vary depending on the area of the heat transfer and the retention time in the reaction system, but the distillation pressure is preferably in the range of from 0.1 to 5 atm. In addition, it is preferred that the degree of vacuum is 200 Torr or more for maintaining the temperature of the cooling medium for cooling and condensing the distilled THF at room temperature or higher, and the degree of vacuum of 600 Torr or less is preferred for improving the distillation rate. Therefore, distillation of THF is preferably performed under 200 to 600 Torr.

Next, a saturated hydrocarbon having 6 to 10 carbon atoms ($C_6$-$C_{10}$ saturated hydrocarbon) is added to the organic phase to thereby remove the residual catalyst. A $C_6$-$C_{10}$ saturated hydrocarbon is preferably used for removing the catalyst, and examples of such saturated hydrocarbons include cyclohexane, cycloheptane, cyclooctane, cyclononane, cyclodecane, methylcyclopentane, methylcyclohexane, 2-ethylhexane, n-hexane, n-heptane, n-octane, n-nonane and n-decane. After the addition of the saturated hydrocarbon to the organic phase, the organic phase has the following composition: 10 to 60 wt % of an oxytetramethylene glycol copolymer, 1 to 30 wt % of THF and 10 to 89 wt % of a saturated hydrocarbon. A saturated hydrocarbon is used as a poor solvent for insolubilizing the heteropolyacid catalyst dissolved in the oxytetramethylene glycol copolymer. However, when the oxytetramethylene glycol copolymer is mixed solely with a saturated hydrocarbon, the copolymer and the saturated hydrocarbon separate into two liquid phases and the saturated hydrocarbon is incapable of exhibiting a satisfactory effect as a poor solvent. For solving this problem, THF which is a good solvent for the catalyst is used in an amount such that THF functions as a surfactant for preventing the phase separation of the oxytetramethylene glycol copolymer and the saturated hydrocarbon. Therefore, it is preferred that the residual THF is contained in the organic phase in a minimum amount which prevents the phase separation of the saturated hydrocarbon and the oxytetramethylene glycol copolymer. The saturated hydrocarbon is used in an amount which is not less than the weight of the oxytetramethylene glycol copolymer so that the saturated hydrocarbon functions effectively as a poor solvent for the catalyst and the amount of the saturated hydrocarbon is sufficient for removing the catalyst.

Only a very small amount of the catalyst phase is separated from the organic phase by the addition of the saturated hydrocarbon and, thus, a portion of the separated catalyst phase gets mixed with the organic phase. Therefore, it is preferred that the organic phase is filtered through a filter having a pore diameter of 1 μm or less. A filter having a pore diameter of 0.5 μm or less is used to filter off the catalyst phase more efficiently.

After the filtration process, the amount of the catalyst remaining in the oxytetramethylene glycol copolymer becomes 100 ppm or less. For further decreasing the catalyst content of the oxytetramethylene glycol copolymer, the organic phase as such can be contacted with a solid adsorbent, such as an activated carbon, calcium oxide, magnesium oxide, cerium oxide, zirconium oxide, alumina and silica alumina. The treatment with the adsorbent is performed at a temperature wherein neither the solidification nor the boiling of the organic phase occurs. In general, the treatment with an adsorbent is performed at −30 to 100° C., preferably at 0 to 67° C., more preferably at 15 to 50° C. The amount of the residual catalyst in the oxytetramethylene glycol copolymer can be decreased to 10 ppm or less by treating the organic phase with a solid adsorbent. An activated carbon is preferably used as a solid adsorbent for removing the catalyst.

The resultant organic phase comprising the oxytetramethylene glycol copolymer is a mixture which additionally contains THF and NPG which are raw material monomers and a saturated hydrocarbon used for removing the catalyst. Such a mixture can be subjected to the below-mentioned purification method of the present invention to remove THF, NPG and the saturated hydrocarbon. Alternatively, the mixture can be subjected to the purification method of the present invention after distilling off THF. When THF is distilled off from the mixture, the resultant mixture separates into a saturated hydrocarbon phase and an oxytetramethylene glycol copolymer phase, and the saturated hydrocarbon phase can be removed from the oxytetramethylene glycol copolymer phase. The thus obtained oxytetramethylene glycol copolymer phase is a solution containing 30 to 70% of an oxytetramethylene glycol copolymer, 0.02 to 10% of NPG and 30 to 70% of a saturated hydrocarbon. NPG and a saturated hydrocarbon contained in such a solution can be removed by not only the purification method of the present invention, but also the conventional purification methods, such as a method described in Unexamined Japanese Patent Application Laid-Open Specification Nos. Hei 9-291147, Hei 10-87813 and Hei 1-92221. However, it is preferred that the purification is performed by the purification method of the present invention which comprises subjecting the reaction mixture to continuous distillation in the presence of fresh tetrahydrofuran at a temperature of from 80 to 160° C. under a pressure of from 5 to 760 Torr, the fresh tetrahydrofuran being added in an amount which is not less than the weight of the unreacted diol contained in the reaction mixture, to thereby distil off the unreacted diol from the reaction mixture together with the added tetrahydrofuran. By the use of this method, it becomes possible to separate the unreacted NPG without causing the solidification of NPG in a condensation system and the like, and the separated NPG can be recycled to the copolymerization system. In addition, the obtained oxytetramethylene glycol copolymer is thermally stable because it contains only a very small amount of low molecular weight components which are easily decomposed by heat.

The oxytetramethylene glycol copolymer obtained by the method of the present invention exhibits highly improved low temperature properties due, for example, to low melting point and low glass transition temperature. Therefore, elastic fibers (e.g., a polyester elastic fiber, a polyurethane elastic fiber and the like), a polyurethane resin, a polyester elastomer and the like having excellent low temperature properties can be produced using the oxytetramethylene glycol copolymer of the present invention.

Further, it is noted that by the method of the present invention, other oxytetramethylene glycol copolymers having excellent low temperature properties can be produced by substituting another diol for NPG.

In another aspect of the present invention, there is provided a method for purifying an oxytetramethylene glycol copolymer, obtained by copolymerizing tetrahydrofuran and a diol represented by the following formula (1):

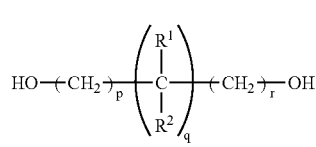

(1)

wherein each of $R^1$ and $R^2$ independently represents a hydrogen atom or a hydrocarbon group having from 1 to 5 carbon atoms; and each of p, q and r independently represents an integer of from 0 to 6, with the proviso that the sum of p, q and r is not less than 2, from a copolymerization reaction mixture comprising an oxytetramethylene glycol copolymer and the unreacted diol, which comprises subjecting the reaction mixture to continuous distillation in the presence of fresh tetrahydrofuran at a temperature of from 80 to 160° C. under a pressure of from 5 to 760 Torr, the fresh tetrahydrofuran being added in an amount which is not less than the weight of the unreacted diol contained in the reaction mixture, to thereby distil off the unreacted diol from the reaction mixture together with the added tetrahydrofuran.

As explained above, the essential feature of the purification method for an oxytetramethylene glycol copolymer resides in the removal of an unreacted diol. By the purification method of the present invention, it has become possible for the first time to remove a diol from an oxytetramethylene glycol copolymer without causing the clogging of a condensation tube and a conduit even when the diol solidifies at around room temperature. Further, a diol which is separated by the purification method of the present invention can be easily recycled to the copolymerization reaction system.

The purification method of the present invention is a method for purifying an oxytetramethylene glycol copolymer, obtained by copolymerizing tetrahydrofuran and a diol represented by formula (1) above, from a copolymerization reaction mixture comprising an oxytetramethylene glycol copolymer and the unreacted diol. The copolymerization reaction mixture which can be subjected to the purification method of the present invention is a reaction mixture obtained by subjecting tetrahydrofuran and a diol represented by formula (1) above to a copolymerization reaction by using an inorganic acid catalyst, and the major component of the reaction mixture is an oxytetramethylene glycol copolymer having a number average molecular weight of from 250 to 5000.

The copolymerization reaction mixture which can be subjected to the purification method of the present invention is explained below.

Specific examples of a diol represented by formula (1) above include ethylene glycol, propylene glycol, 1,3-propanediol, 1,4-butanediol, 1,3-butanediol, 1,5-pentanediol, 1,4-pentanediol, 1,3-pentanediol, 1,2-pentanediol, neopentyl glycol, 1,6-hexanediol, 2-methylbutane-1,4-diol, 1,7-heptanediol and 1,8-octanediol. The diol may be used individually or in combination. Among the above-mentioned diols, ethylene glycol, propylene glycol, 1,3-propanediol, 1,4-butanediol, 1,3-butanediol, 1,5-pentanediol, 1,4-pentanediol, 1,3-pentanediol, 1,2-pentanediol, neopentyl glycol, 2-methylbutane-1,4-diol, 1,6-hexanediol, 1,5-hexanediol, 1,4-hexanediol, 1,3-hexanediol and 1,2-hexanediol which are diols having 2 to 6 carbon atoms have a relatively low boiling point, so that these diols can be easily recovered by distillation.

There is no particular limitation with respect to the inorganic acid used to obtain the reaction mixture as long as the inorganic acid exhibits the properties of a BrØnsted acid or a Lewis acid. An inorganic acid which is most suitable for the catalyst is a heteropolyacid. A heteropolyacid is an acid obtained by the condensation of an oxide of at least one metal species selected from the group consisting of molybdenum (Mo), tungsten (W) and vanadium (V), and an oxyacid of other elements, such as phosphorus (P), silicon (Si), arsenic (As), germanium (Ge), boron (B), titanium (Ti), cerium (Ce) and cobalt (Co). The atomic ratio of the metal species (any one or more of metals selected from the group consisting of Mo, W and V) contained in the heteropolyacid to other elements in the heteropolyacid is 2.5 to 12.

The heteropolyacid may be in the form of a BrØnsted acid or a salt thereof. Specific examples of heteropolyacids and salts thereof include phosphomolybdic acid, phosphotungstic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovanadic acid, germanotungstic acid, borotungstic acid, boromolybdic acid, boromolybdotungstic acid, boromolybdovanadic acid, boromolybdotungstovanadic acid, cobaltmolbdic acid, cobalttungstic acid, arsenomolybdic acid, arsenotungstic acid, titanomolybdic acid and ceromolybdic acid, and metal salts thereof.

For performing the copolymerization reaction, an inorganic acid as a polymerization catalyst, THF and a diol as raw material monomers and a reaction terminator are used. Specific examples of reaction terminators include water and a diol which is a copolymerizing monomer.

The copolymerization reaction is performed in a two-phase reaction system which comprises an organic phase comprising a solution of a diol in tetrahydrofuran, and a tetrahydrofuran/aqueous heteropolyacid phase (hereinafter, frequently referred to as a "catalyst phase") comprising a solution of an aqueous heteropolyacid catalyst in tetrahydrofuran and having a specific gravity of from 1.8 to 2.3. The oxytetramethylene glycol copolymer produced by the copolymerization reaction is dissolved in the organic phase.

The inorganic acid used as a catalyst is sparingly soluble in an anhydrous THF, but well soluble in a mixed solvent prepared by adding a small amount of water to THF. The reason why the inorganic acid is soluble in mixed solvent of THF and water is not fully elucidated, but it is considered that a small amount of water is coordinated to the inorganic acid. The reaction system separates into a two-phase reaction system which comprises an organic phase and a tetrahydrofuran/aqueous inorganic acid phase having a specific gravity of from 1.8 to 2.3 by adjusting the amounts of water, a diol, THF and the like which are present in the reaction system.

The copolymerization reaction for producing an oxytetramethylene glycol copolymer can be performed in a batchwise manner or a continuous manner.

There is no particular limitation with respect to the temperature for the copolymerization reaction as long as the copolymerization reaction proceeds at that temperature. However, for incorporating 2 or more diol molecules into a copolymer chain, a dehydration reaction is generally required. For performing the dehydration reaction, it is necessary to conduct the copolymerization reaction at a high temperature which is not lower than 50° C. Further, for avoiding the heat decomposition of a diol and the depolymerization of the produced oxytetramethylene glycol copolymer, it is preferred that the reaction temperature is not more than 100° C. Especially when the copolymerization reaction is performed at a temperature in the range of from 55 to 80° C., the heat decomposition of a diol and the depolymerization of the produced oxytetramethylene glycol copolymer are suppressed, and the copolymerization can be performed under low pressure conditions.

Further, when 2 or more diol molecules are incorporated into a copolymer chain, the reaction rate can be improved by withdrawing water by-produced by the reaction from the reaction system. With respect to the method for withdrawing water from the reaction system, there can be mentioned a method in which an azeotropic vapor of water and THF are distilled off from the reaction system and THF in an amount which is equivalent to the amount of THF removed by the azeotropic distillation is returned to the reaction mixture. This water withdrawal process can be performed in a continuous manner or an intermittent manner, but from the viewpoint of ease in performing the polymerization operation, the water/THF vapor is continuously withdrawn from the reaction system while simultaneously and continuously feeding THF containing only a small amount of water to the reaction system.

In this method, the azeotropic distillation of water and THF can be performed either by withdrawing the gaseous phase composed of the azeotropic vapor from the reaction system or by separating the reaction system into the catalyst phase and the organic phase, followed by the withdrawal of the azeotropic vapor of water and THF from the separated organic phase.

In the method in which water and THF are removed by azeotropic distillation from a reaction system containing both the organic phase and the catalyst phase, since the mol fraction of water in the catalyst phase is higher than the mol fraction of water in the organic phase, the mol fraction of water in the total of the organic phase and the catalyst phase is higher than the mol fraction of the organic phase. Therefore, this method is considered to exhibit higher water removal efficiency than a method in which the organic phase is separated from the catalyst phase and, then, water is removed from the organic phase. Further, in this method, a lowering of the inner pressure of the reactor for lowering the boiling point of water is effective for improving the water withdrawal rate. However, in a method in which water in the reaction system comprising both the organic phase and the catalyst phase is removed with THF by azeotropic distillation, when the water removal is performed at a high reaction rate such that the latent heat of vaporization necessary for the azeotropic distillation adversely affects the reaction temperature, a precise control of the reaction temperature may become difficult.

For removing water while maintaining the stable polymerization reaction conditions, it is preferred that the reaction system is separated into the organic phase and the catalyst phase and, then, the azeotropic mixture of water and THF is withdrawn from the organic phase. In this method, it is preferred that a part of the organic phase withdrawn from the reaction system is returned to the reaction system so as to achieve a predetermined retention time.

For producing an oxytetramethylene glycol copolymer, the amount of oxygen present in the reaction system is suppressed to a level as low as possible for preventing the discoloration of the oxytetramethylene glycol copolymer which is caused by the presence of oxygen during the polymerization reaction. Specifically, the oxygen concentration of the reaction system is preferably 1000 ppm or less, and the low oxygen concentration can be achieved by performing the polymerization reaction in an atmosphere of an inert gas, such as nitrogen gas, helium gas, argon gas and neon gas.

When the copolymerization reaction mixture obtained in the above-mentioned manner is left still after the termination of the polymerization reaction, a phase separation of the reaction mixture into a reaction-formed organic phase containing the oxytetramethylene glycol copolymer and a catalyst phase occurs. If only the reaction-formed organic phase thus obtained is recovered a large part of the polymerization catalyst contained in the reaction mixture can be removed. However, since the reaction-formed organic phase contains a small amount of the catalyst, it is preferred that the residual catalyst is removed before performing the purification method of the present invention.

Next, an explanation is made on one example of a method for preparing a reaction mixture which can be subjected to the purification method of the present invention.

The organic phase which is separated from the catalyst phase is subjected to distillation to thereby remove a portion of the THF remaining in the organic phase. It is preferred that the temperature for distilling off THF is in the range of from 40 to 100° C. Since a small amount of the polymerization catalyst is also dissolved in the organic phase, the exposure of the organic phase to high temperatures for a long time may cause problems, such as depolymerization of a THF terminal of the oxytetramethylene glycol copolymer, and incorporation of the unreacted diol into the oxytetramethylene glycol copolymer by the dehydration condensation between a part of the unreacted diol and the oxytetramethylene glycol copolymer. Therefore, the distillation of THF is preferably performed at a relatively low temperature, that is, a temperature which is not more than 70° C., more preferably 50 to 60° C. Further, an optimum range of the distillation pressure may slightly vary depending on the area of the heat transfer and the retention time of THF in the reaction system, but, in general, the distillation pressure is preferably in the range of from 0.1 to 5 atm. In addition, it is preferred that the degree of vacuum is 200 Torr or more for maintaining the temperature of the cooling medium for cooling and condensing the distilled THF at room temperature or higher, and the degree of vacuum of 600 Torr or less is preferred for improving the distillation rate. Therefore, distillation of THF is preferably performed under 200 to 600 Torr.

Subsequently, the residual catalyst contained in the organic phase is removed. There is no particular limitation with respect to the method for removing the residual catalyst, and there can be mentioned a method which uses a column for removing the catalyst (i.e., a catalyst removal column), a method which uses a halogen-type solvent, and a method which uses a saturated hydrocarbon.

When the catalyst is removed by using a catalyst removal column, the organic phase is passed through a column packed with a solid adsorbent, such as an activated carbon, calcium oxide, magnesium oxide, cerium oxide, zirconium oxide, alumina and silica alumina. The treatment with the adsorbent is performed at a temperature at which neither solidification nor boiling of the organic phase occurs. In general, the treatment with an adsorbent is performed at −30 to 100° C., preferably at 0 to 67° C., more preferably at 15 to 50° C.

In the method which uses a halogen-type solvent, a halogenated hydrocarbon having 1 to 15 carbon atoms, such as chloroform, trichlorotrifluoroethane, trichlorofluoroethane or chlorobenzene, is added to the organic phase to thereby precipitate the catalyst.

In the method which employs a saturated hydrocarbon, a saturated hydrocarbon having 6 to 10 carbon atoms is added to the organic phase to thereby separate the resultant mixture into two phases. This method is especially preferred because not only is high the catalyst removal efficiency, but also the risk of causing a corrosion of the apparatuses used in commercial plants is low. A $C_6$-$C_{10}$ saturated hydrocarbon is preferably used for removing the catalyst, and examples of such saturated hydrocarbons include cyclohexane, cycloheptane, cyclooctane, cyclononane, cyclodecane, methylcyclopentane, methylcyclohexane, 2-ethylhexane, n-hexane, n-heptane, n-octane, n-nonane and n-decane. As explained below, when a saturated hydrocarbon alone is distilled off from the mixture of the organic phase and the saturated hydrocarbon, a low molecular weight hydrocarbon having 8 or less carbon atoms is preferred. Alternatively, when a saturated hydrocarbon is distilled off together with a diol and an added THF, for facilitating the recycling of the saturated hydrocarbon which is distilled off from the mixture, it is preferred that the saturated hydrocarbon is one which is capable of being separated from THF, based on the difference in boiling point. That is, a preferred saturated hydrocarbon is a saturated hydrocarbon having 7 or more carbon atoms which has a boiling point different from that of THF.

After the addition of the saturated hydrocarbon to the organic phase, the organic phase has the following composition: 10 to 60 wt % of an oxytetramethylene glycol copolymer, 1 to 30 wt % of THF and 10 to 89 wt % of a saturated hydrocarbon. A saturated hydrocarbon is used as a poor solvent for insolubilizing the heteropolyacid catalyst dissolved in the oxytetramethylene glycol copolymer. However, when the oxytetramethylene glycol copolymer is mixed solely with a saturated hydrocarbon, the copolymer and the saturated hydrocarbon separate into two liquid phases and the saturated hydrocarbon is incapable of exhibiting a satisfactory effect as a poor solvent. For solving this problem, THF which is a good solvent for the catalyst is used in an amount such that THF functions as a surfactant for preventing the phase separation of the oxytetramethylene glycol copolymer and the saturated hydrocarbon. Therefore, it is preferred that the residual THF is contained in the organic phase in a minimum amount which prevents the phase separation of the saturated hydrocarbon and the oxytetramethylene glycol copolymer. The saturated hydrocarbon is used in an amount which is not less than the weight of the oxytetramethylene glycol copolymer so that the saturated hydrocarbon functions effectively as a poor solvent for the catalyst and the amount of the saturated hydrocarbon is sufficient for removing the catalyst.

Only a very small amount of the catalyst phase is separated from the organic phase by the addition of the saturated hydrocarbon and, thus, a portion of the separated catalyst phase gets mixed with the organic phase. Therefore, it is preferred that the organic phase is filtered through a filter having a pore diameter of 1 μm or less. A filter having a pore diameter of 0.5 μm or less is used to filter off the catalyst phase more efficiently.

After the filtration process, the amount of the catalyst remaining in the oxytetramethylene glycol copolymer becomes 100 ppm or less. For further decreasing the catalyst content of the oxytetramethylene glycol copolymer, the organic phase as such can be treated with the catalyst removal column mentioned above. The amount of the residual catalyst in the oxytetramethylene glycol copolymer can be decreased to 10 ppm or less by such a treatment.

The resultant organic phase comprising the oxytetramethylene glycol copolymer is a mixture which additionally contains THF and a diol which are raw material monomers and a saturated hydrocarbon used for removing the catalyst. Such a mixture can be subjected to the purification method of the present invention. Alternatively, the mixture can be subjected to the purification method of the present invention after distilling off THF. When THF is distilled off from the mixture, the resultant mixture separates into a saturated hydrocarbon phase and an oxytetramethylene glycol copolymer phase, and the saturated hydrocarbon phase can be removed from the oxytetramethylene glycol copolymer phase.

Next, a detailed explanation is made on the method for purifying an oxytetramethylene glycol copolymer from a copolymerization reaction mixture comprising an oxytetramethylene glycol copolymer and an unreacted diol.

The purification method of the present invention comprises subjecting the reaction mixture to continuous distillation in the presence of fresh tetrahydrofuran at a temperature of from 80 to 160° C. under a pressure of from 5 to 760 Torr, the fresh tetrahydrofuran being added in an amount which is not less than the weight of the unreacted diol contained in the reaction mixture, to thereby distil off the unreacted diol from the reaction mixture together with the added tetrahydrofuran.

The reaction mixture which is subjected to the purification method of the present invention may or may not contain a saturated hydrocarbon. The reaction mixture obtained by removing the catalyst with a saturated hydrocarbon contains 30 to 70% of an oxytetramethylene glycol copolymer, 0.02 to 10% of a diol and 30 to 70% of a saturated hydrocarbon. On the other hand, when the catalyst is removed without using a saturated hydrocarbon, for example, by using a catalyst removal column, the resultant reaction mixture contains 20 to 99% of an oxytetramethylene glycol copolymer, 1 to 80% of THF and 0.02 to 10% of a diol. It should be noted that the reaction mixture may or may not contain THF. When the reaction mixture contains only a small amount of THF, a large part of THF has been removed during the removal of the catalyst.

There are two different modes for purifying an oxytetramethylene glycol copolymer from a reaction mixture containing a saturated hydrocarbon. One of the two modes is a one-step purification method in which a saturated hydrocarbon is removed together with unreacted diol and an added THF by distillation in one step, and the other mode is a two-step purification method in which a saturated hydrocarbon is distilled off from a reaction mixture in a first step and, then, the unreacted diol is distilled off together with the added THF from the reaction mixture in a second step. The one-step purification method can be used for purifying an oxytetramethylene glycol copolymer from a reaction mixture which does not contain a saturated hydrocarbon.

The one-step purification method is explained below referring to FIG. 4.

Figure 4:
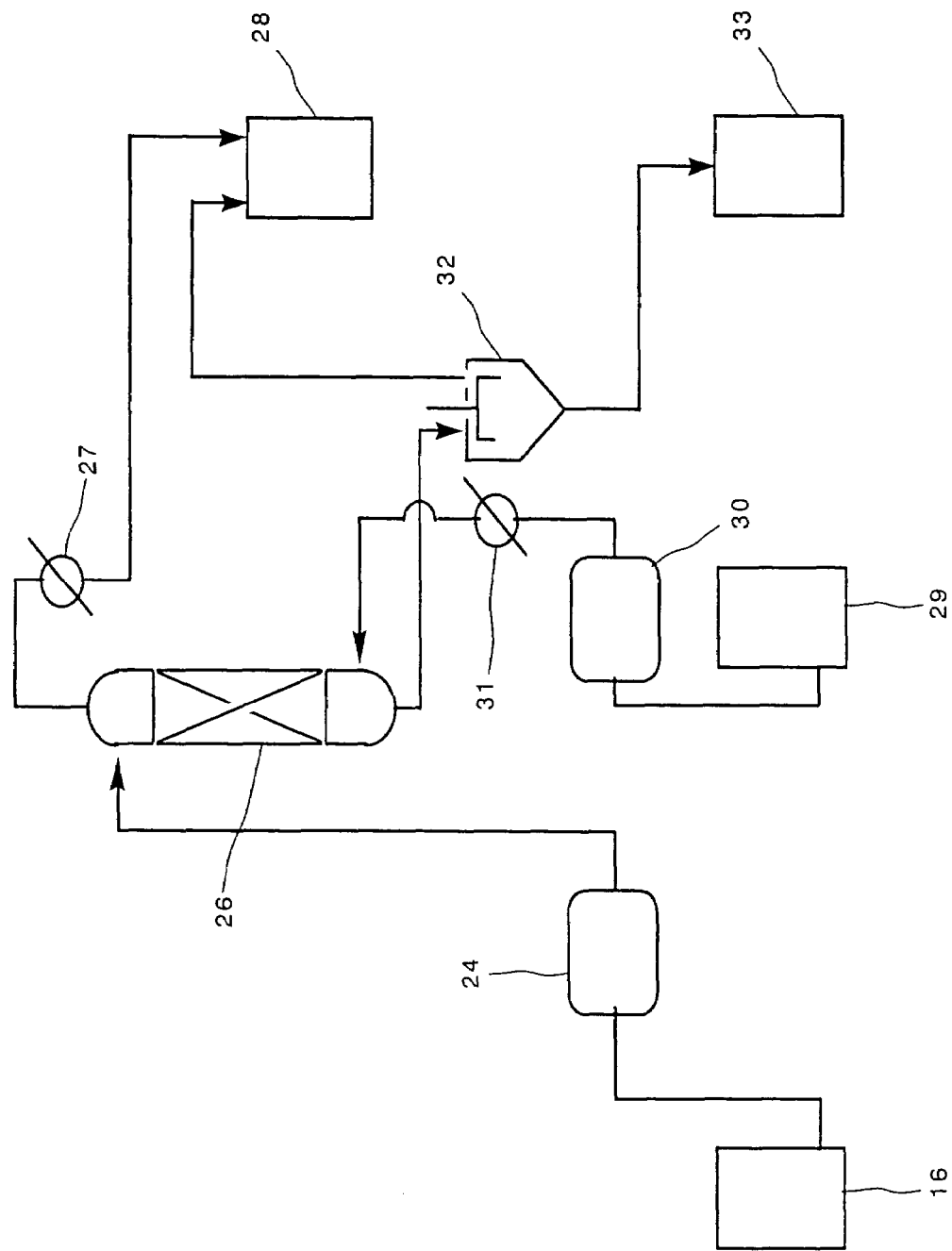
FIG. 4 is a schematic diagram showing an example of the continuous purification system for performing the one-step purification method which is used for purifying the oxytetramethylene glycol copolymer of the present invention.

FIG. 4 is a schematic diagram showing an example of the continuous purification system for performing the one-step purification method which is used for purifying the oxytetramethylene glycol copolymer of the present invention.

A reaction mixture is stored in reaction mixture tank 16 and fed to the upper portion of distillation column 26 by using pump 24. In distillation column 26, the distillation temperature is maintained at 80 to 160° C. An oxytetramethylene glycol copolymer exhibits almost no vapor pressure at a distillation temperature from 80 to 160° C. and, thus, the oxytetramethylene glycol copolymer as such flows downward to the bottom portion of the distillation column. On the other hand, a saturated hydrocarbon and a diol in the reaction mixture are converted into a gaseous component and separated from the oxytetramethylene glycol copolymer.

As explained above, since a diol solidifies at around room temperature, a diol which is separated as a gaseous component in the distillation column is likely to solidify in condensing means 27 which is provided in the downstream of the distillation column and cause problems, such as clogging of a conduit. In the present invention, for preventing such a solidification of the diol, fresh THF in fresh THF tank 29 is vaporized using heating means 31 and the resultant gaseous THF is fed to the bottom portion of distillation column 26 via pump 30 so as to distill off the diol together with the fresh THF.

In the present invention, the "fresh THF" means a newly added THF and it is different from the residual THF in the reaction mixture which is an unreacted THF monomer. The fresh THF may be an unused THF or a recycled THF mentioned below.

When a large amount of the fresh THF is fed from the bottom portion of the distillation column, the distillation rate of the diol becomes improved. However, an increase in the amount of the fresh THF causes an increase in the energy cost for the condensation of distilled THF. As a consequence, the amount of the fresh THF being added to the reaction mixture is the minimum amount of THF necessary for preventing the solidification of the diol. More specifically, the fresh THF is added in an amount which is not less than the weight of the unreacted diol contained in the reaction mixture. The amount of the fresh THF necessary for distillation may vary depending on the amount of the diol contained in the reaction mixture which is fed from the top portion of the distillation column, but in general, THF is fed at a feeding rate which is not lower than the feeding rate of the reaction mixture, preferably not less than two times the feeding rate of the reaction mixture. When the inner temperature of the distillation column is 130° C. or less, it is preferred that THF is fed at a feeding rate which is not lower than 2.5 times the feeding rate of the reaction mixture. In any case, the feeding rate of THF is not more than 100 times, preferably not more than 20 times, more preferably not more than 5 times the feeding rate of the reaction mixture. Since the amount of the unreacted diol contained in the reaction mixture is very small, when the feeding rate of THF is in the abovementioned range, the weight ratio of the added THF to the unreacted diol becomes 800 or more, preferably 1,500 or more and not more than 50,000.

It is preferred that the diol is removed by a multi-stage distillation. With respect to the inner pressure of the distillation column, a low pressure is preferred because the lower the inner pressure of the distillation column, the higher the distillation efficiency for removing diol. Specifically, the distillation is performed under 760 Torr or less. However, for decreasing the amount of energy used for condensing the vapor distilled off from the distillation column, an inner pressure of 5 Torr or more is necessary. Therefore, in the present invention, it is preferred that the removal of the unreacted diol is performed under a pressure from 5 to 760 Torr, preferably from 100 to 600 Torr, more preferably from 300 to 500 Torr.

As explained above, in the purification method of the present invention, a reaction mixture comprising a diol, a saturated hydrocarbon and an oxytetramethylene glycol copolymer is fed to the upper portion of a distillation column to thereby cause the reaction mixture to flow downward in the distillation column, and a high temperature gaseous THF is fed to the bottom portion of the distillation column to thereby cause the gaseous THF to flow upward in the distillation column while vaporizing the diol and the saturated hydrocarbon contained in the reaction mixture at different stages of the distillation column and withdrawing the vaporized diol and saturated hydrocarbon together with the added THF from the column top of the distillation column. Such a distillation method employed in the present invention is called a stripping method.

The reaction mixture in which the diol and the saturated hydrocarbon have been removed by the stripping method is a viscous liquid comprising an oxytetramethylene glycol copolymer and THF. THF and other low boiling point components contained in this liquid are separated by centrifugal molecular distillation apparatus 32. The distillation temperature used to separate THF is 80 to 180° C. It is preferred that the distillation temperature is as low as possible for suppressing the heat deterioration of the oxytetramethylene glycol copolymer. Specifically, the distillation is preferably performed at 160° C. or less. In addition, with respect to the pressure, high vacuum is preferred, but due to the problems concerning the distillation apparatus, the pressure in the range of from 0.01 to 10 Torr is appropriately used. Various molecular distillation apparatuses other than the centrifugal molecular distillation apparatus can be used in the present invention. Specifically, use can be made of a pot still type molecular distillation apparatus, a falling film type molecular distillation apparatus and a centrifugal molecular distillation apparatus. As a centrifugal molecular distillation apparatus, there can be mentioned a rotary tray type molecular distillation apparatus and an Arthur type molecular distillation apparatus.

The purification of the oxytetramethylene glycol copolymer is completed by the removal of THF in the above-mentioned manner. The purified oxytetramethylene glycol copolymer is recovered in oxytetramethylene glycol copolymer tank 33 and the separated THF and the low boiling point substances are recovered in raw material tank 28.

The purified oxytetramethylene glycol copolymer can be analyzed by gas chromatography to thereby confirm the composition of the purified oxytetramethylene glycol copolymer. The purified oxytetramethylene glycol copolymer comprises not more than 500 ppm of a diol, not more than 1,000 ppm of a saturated hydrocarbon and not less than 98% of an oxytetramethylene glycol copolymer.

In the above-mentioned one-step purification method, THF, a diol and a saturated hydrocarbon which are removed by the stripping method are obtained as a mixture. When raw material monomers containing a saturated hydrocarbon is reused in the copolymerization reaction, the saturated hydrocarbon may cause an adverse effect on the copolymerization reaction rate. Therefore, it is necessary to separate and remove the saturated hydrocarbon from the recovered raw material monomers before reusing the recovered raw material monomers.

Figure 5:
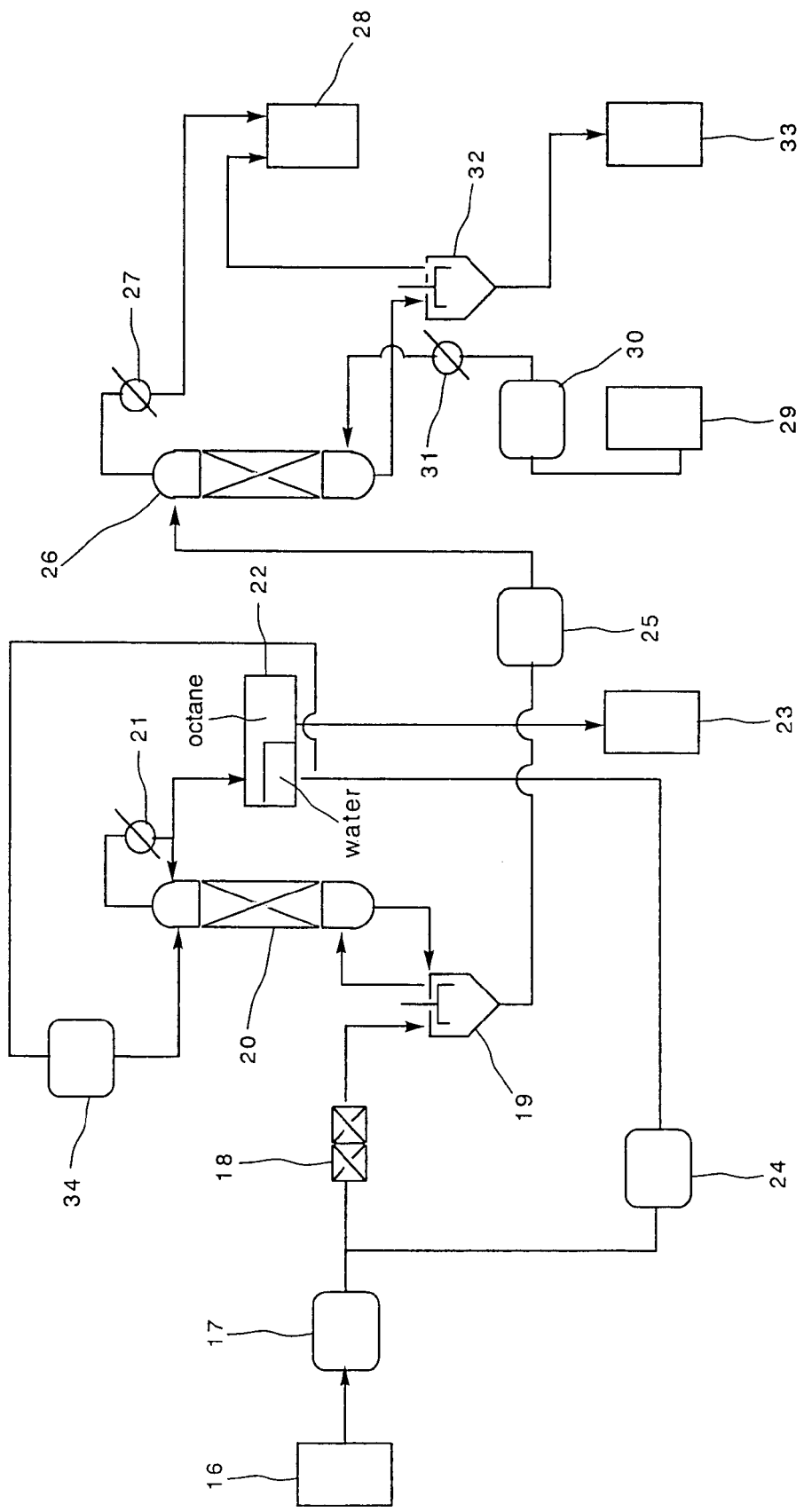
FIG. 5 is a schematic diagram showing another example of the continuous purification system for performing the two-step purification method which is used for purifying the oxytetramethylene glycol copolymer of the present invention.

Next, the two-step purification method is explained referring to FIG. 5.

FIG. 5 is a schematic diagram showing another example of the continuous purification system for performing the two-step purification method which is used for purifying the oxytetramethylene glycol copolymer of the present invention.

The two-step purification method is a method in which a saturated hydrocarbon alone is distilled off from the reaction mixture in a first step and, then, a diol is distilled off by the stripping method in a second step to thereby purify an oxytetramethylene glycol copolymer.

A reaction mixture is fed to centrifugal molecular distillation apparatus 19 from reaction mixture tank 16 by using pump 17 to thereby remove a saturated hydrocarbon from the reaction mixture. The distillation performed in centrifugal molecular distillation apparatus 19 is performed under conditions wherein the solution temperature is 70 to 160° C. The decomposition and discoloration of the oxytetramethylene glycol copolymer are induced when the solution temperature becomes too high and, thus, it is desired that the solution temperature is as low as possible. However, when the distillation temperature is too low, a large amount of a saturated hydrocarbon will remain in the oxytetramethylene glycol copolymer. As a consequence, the solution temperature is preferably in the range of from 90 to 130° C.

The distillation pressure may vary depending on the distillation apparatus and distillation temperature used, but the distillation pressure is in the range of from 1 to 450 Torr. When the distillation apparatus is relatively small, it is necessary to conduct the distillation under 100 Torr or less.

The molecular distillation apparatus used for distilling off the saturated hydrocarbon is not limited to the centrifugal molecular distillation apparatus, and use can be made of the various molecular distillation apparatuses mentioned above.

The saturated hydrocarbon content of the reaction mixture can be decreased to 0.0001 to 0.002, in terms of the weight ratio of the saturated hydrocarbon to the oxytetramethylene glycol copolymer, by removing the saturated hydrocarbon from the reaction mixture by using centrifugal molecular distillation apparatus 19 under the above-mentioned conditions.

The saturated hydrocarbon which is separated and removed by means of the centrifugal molecular distillation apparatus 19 is recovered after subjected to a distillation treatment by using distillation column 20. Since a portion of the diol contained in the reaction mixture is also removed together with the saturated hydrocarbon by the centrifugal molecular distillation, the diol contained in the saturated hydrocarbon solidifies in the distillation column and the condensation system because the diol solidifies at around room temperature. For preventing such a solidification of diol, it is preferred that water which is a good solvent for a diol is added to the distilled-off saturated hydrocarbon (containing a diol) and the diol is removed from the resultant mixture by condensation thereof. Specifically, after recovering the saturated hydrocarbon containing a diol from centrifugal molecular distillation apparatus 19, water is added to the saturated hydrocarbon by using pump 24. Water is added in an amount which is sufficient to prevent the solidification of a diol in the distillation column. Specifically, the amount of water added is at least 5 times the weight of unreacted diol contained in the reaction mixture. Since water causes a lowering of the boiling point of the saturated hydrocarbon by forming an azeotropic mixture with the saturated hydrocarbon, for facilitating the distillation of the saturated hydrocarbon (that is, for exhibiting the azeotropic effect of water), the weight ratio of the water to the saturated hydrocarbon is from 0.1 to 1, preferably from 0.25 to 0.5.

The saturated hydrocarbon having water mixed therewith is fed to distillation column 20. Since the saturated hydrocarbon contains water, during the condensation reaction of diol which is occurring in the distillation column, the diol contained in the saturated hydrocarbon is always condensed simultaneously with water which is a good solvent for a diol. Therefore, the diol is not solidified in distillation column 20. Further, during the distillation in distillation column 20, water is fed from the top of the distillation column by using pump 34 so that the water concentration of each stage of the distillation column becomes constant. In addition, the gaseous diol which is withdrawn from the column top of distillation column 20 is condensed in condensing means 21 together with water which has been fed to the distillation column by using pumps 24 and 34. The condensate which is a mixture of the saturated hydrocarbon and water is subjected to a two-phase separation by using decanter 22 and the separated water is reused.

In the two-step purification method, the saturated hydrocarbon-removed reaction mixture is fed to distillation column 26 by using pump 25. The diol remaining in the reaction mixture is removed in the second step of the two-step purification method by the same stripping method (as mentioned in connection with the one-step purification method) by using distillation column 26. The stripping method is performed under the conditions which are explained in connection with the one-step purification method.

A mixture of an oxytetramethylene glycol copolymer and THF is obtained by the distillation performed in the second step (stripping method) of the two-step purification method. Like the mixture obtained by the one-step purification method, the mixture obtained by the two-step purification method is a viscous liquid comprising an oxytetramethylene glycol copolymer and THF. THF and other low boiling point components contained in this liquid are separated by centrifugal molecular distillation apparatus 32 as in the one-step purification method. The purified oxytetramethylene glycol copolymer is recovered in oxytetramethylene glycol copolymer tank 33 and the separated low boiling point substances are recovered in raw material tank 28.

The purified oxytetramethylene glycol copolymer can be analyzed by gas chromatography to thereby confirm the composition of the oxytetramethylene glycol copolymer. The purified oxytetramethylene glycol copolymer comprises not more than 500 ppm of a diol, not more than 1,000 ppm of a saturated hydrocarbon and not less than 98% of an oxytetramethylene glycol copolymer.

The oxytetramethylene glycol copolymer obtained by either of the above-mentioned two purification methods contains only trace amounts of the low molecular weight components which are easily decomposed by heat and, thus, the obtained oxytetramethylene glycol copolymer has high thermal stability.

Further, in the two-step purification method, a saturated hydrocarbon and a diol are separately removed in the course of the purification process and, thus, the separated saturated hydrocarbon and the separated diol can be reused with ease.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, various properties were measured using the following methods.

(1) Number Average Molecular Weight of an Oxytetramethylene Glycol Copolymer

The number average molecular weight of an oxytetramethylene glycol copolymer is calculated from the OH value of the copolymer.

i) Method for Analysis

①  To a 50 ml eggplant type flask is added an oxytetramethylene glycol copolymer in an amount (unit: mg) which is 1.39 times the expected molecular weight of the oxytetramethylene glycol copolymer. (For example, when the expected molecular weight is 1,800, 1800×1.39=2,502 mg is added.)

②Approximately 5.0 g of a pyridine solution of anhydrous phthalic acid (a solution obtained by dissolving 14 g of anhydrous phthalic acid into 100 ml of pyridine) is added to the eggplant type flask containing the copolymer.

③An air condenser is attached to the eggplant type flask and the resultant eggplant type flask is immersed in an oil bath at 98° C. while stirring slowly for 2 hours.

④The eggplant type flask is taken out from the oil bath and cooled at room temperature for approximately 1 hour to obtain a mixture.

⑤Aqueous 50% by weight pyridine solution is added to the mixture obtained in step ④ above from the upper portion of the air condenser.

⑥The resultant mixture obtained in the eggplant type flask is agitated and, then, neutralization titration is performed with 1N KOH by using phenolphthalein as an indicator.

⑦Blank test was performed by repeating steps ① to ⑥ above except that the oxytetramethylene glycol copolymer is not used and 3.5 g of the pyridine solution of anhydrous phthalic acid is used.

⑧The OH value and the number average molecular weight of the oxytetramethylene glycol copolymer are calculated in accordance with the following formula:

OH value=[X×amount (g) of pyridine solution of anhydrous phthalic acid−titration amount (ml) of aqueous KOH solution]×KOH factor×56.1/ amount (g) of oxytetramethylene glycol copolymer, wherein X represents the titration amount of aqueous KOH solution (ml) in the blank test (using pyridine solution of anhydrous phthalic acid).

KOH factor is the actual effective alkalinity of 1N aqueous KOH solution.

Mn is calculated from the OH value in accordance with the following formula:

$Mn=112,200/OH$ value.

(2) Molecular Weight Distribution of an Oxytetramethylene Glycol Copolymer

The molecular weight distribution of an oxytetramethylene glycol copolymer is obtained by an analytical gel permeation chromatography (analytical GPC).

i) Instruments
GPC apparatus: HLC-8220 GPC (manufactured and sold by Tosoh Corporation, Japan)
Column: TSKgel SuperH3000 (1 column),
TSKgel SuperH2000 (2 columns) and
TSKgel SuperH1000 (2 columns)
(each manufactured and sold by Tosoh Corporation, Japan)

ii) Conditions Used for Analysis
Detector: Differential refractometer (RI)
Temperature: 40° C.
Eluent: Chloroform (HPLC grade)
Flow rate of eluent: 0.4 ml/min
Sample: 0.5% by weight solution of a copolymer in chloroform
Amount of injected sample: 20 µl
Molecular weight standards: Polystryrenes (Mn=96,000, Mn=30,300, Mn=13,000, Mn=7,000, Mn=5,050, Mn=2,100, Mn=1,300 and Mn=580) and styrene monomer (Mn=104)

(3) Preparative Gel Permeation Chromatography (Preparative GPC) of an Oxytetramethylene Glycol Copolymer i) Instruments
GPC apparatus: LC-908 (manufactured and sold by Japan Analytical Industry Co., Ltd., Japan)
Column: Shodex H2001 and H2002 are used when the number average molecular weight is less than 3,000, and Shodex H2001, H2002 and H2002.5 are used when the number average molecular weight is 3,000 or more (each manufactured and sold by Showa Denko K. K., Japan)

ii) Conditions Used for Analysis
Detector: Differential refractometer (RI)
Temperature: 40° C.
Eluent: chloroform
Flow rate of the eluent: 3 ml/min
Sample: chloroform solution containing 3% by weight of a copolymer which is obtained by adding 1.5 g of a sample copolymer to 48.5 g of chloroform
Amount of the injected sample: 3 ml
Sampling number for fractions: 5
Sampling interval for fractions: 10 sec (4) Obtainment of a High Molecular Weight-Side 15 wt % Fraction of an Oxytetramethylene Glycol Copolymer A preparative GPC is performed under the conditions described in item (3) above to thereby obtain a chromatogram (the abscissa indicates the retention time and the ordinate indicates the RI detection voltage). A fraction of the oxytetramethylene glycol copolymer which corresponds to the area of a part of the whole peak shown in the chromatogram was recovered, wherein the part is taken on the side of the high molecular weight including the maximum molecular weight in the whole peak and wherein the area of the part of the whole peak is 15%, based on the area of the whole peak. Chloroform is distilled off from the recovered fraction at 60° C. under 5 Torr, thereby obtaining a high molecular weight-side 15 wt % fraction.

(5) Neopentyl Glycol Copolymerization Ratio

The neopentyl glycol copolymerization ratio is measured by means of $^1$H-NMR. Specifically, the neopentyl glycol copolymerization ratio is calculated from the integral value of the methylene protons of methylene groups of a THF chain having methylene groups at both terminals thereof and the integral value of the methyl protons of NPG.

$^1$H-NMR is performed under the following conditions.

i) Instruments
Apparatus: $^1$H-NMR model d-400 (manufactured and sold by JEOL Ltd., Japan)

ii) Conditions Used for Analysis
Observation frequency: 400 MHz ($^1$H)
Pulse length: 45°
Observation temperature: room temperature
Accumulation number: 64
Solvent: $CDCl_3$ (6) Glass Transition Temperature Glass transition temperature of an oxytetramethylene glycol copolymer is determined by means of the below-mentioned differential scanning calorimeter (DSC).

i) Instruments
DSC apparatus: DSC220C (manufactured and sold by Seiko Instruments Inc., Japan)

ii) Conditions Used for Analysis
  Rate of increase in temperature: 10° C./min
  Range of temperature used for analysis:
    −100 to 100° C.
  Atmosphere used for analysis:
    Nitrogen gas atmosphere (flow rate: 40 ml/min)
  Amount of sample: 10 to 11 mg (7) Thermal Stability of an Oxytetramethylene Glycol Copolymer An oxytetramethylene glycol copolymer is analyzed by thermogravimetric analysis (TGA) by using the instrument and the conditions explained below, to thereby determine the temperature at which the weight of a sample copolymer is reduced by 5%. This temperature was used as an index for thermal stability.

i) Instrument
  Apparatus: TA 2950 (manufactured and sold by TA Instrument, U.S.A)

ii) Conditions Used for Analysis
  Rate of increase in temperature: 10° C./min
  Range of temperature used for analysis:
    Room temperature to 500° C.
  Atmosphere used for analysis:
    Nitrogen gas atmosphere (purge time: 1 hour)

(8) Determination of a Neopentyl Glycol (NPG) Content

A neopentyl glycol content of an organic phase or a reaction mixture is determined by gas chromatography (GC). Specifically, the gas chromatography of a sample is performed under the following conditions to thereby separate NPG from the sample, and the NPG content is calculated from the peak area of the chromatogram.

i) Instrument
  GC apparatus:
    GC17A (manufactured and sold by Shimadzu Corporation, Japan)
  Column: ULTRA1 (manufactured and sold by Hewlett Packard, U.S.A)
  Liquid phase: Crosslinked Methyl Siloxane
    (length: 25 m, inner diameter: 0.2 mm, thickness of film of liquid phase: 0.33 µm)

ii) Conditions Used for Analysis
  Temperature
    Injection: 300° C.
    Detector: 300° C.
    Column: maintained at 60° C. for 5 min, followed by temperature elevation to 300° C. at a rate of 20° C./min; and, then, maintained at 300° C. for 8 min.
  Sample: 10% by weight solution of a reaction mixture (or an organic phase)

iii) Method for Analysis

Acetone solutions individually containing 50, 100, 500, 1000 and 5000 ppm of NPG are analyzed by GC to thereby obtain a chromatogram. The relationship between the peak area and the NPG concentration is determined from the obtained chromatogram, and the determined relationship is used to calculate the NPG concentration of the sample.

(9) Heteropolyacid Content

The heteropolyacid used as a catalyst in the present invention contained tungsten as the metal species. Therefore, the tungsten concentration of the heteropolyacid was determined by ICP-mass spectrometry and used as the heteropolyacid content.

A. Apparatus:
  PQΩ-type ICP-MS (manufactured and sold by VG Elemental, England)

B. Method for ICP-Mass Spectrometry:
  ① Approximately 5 g of a sample is placed in a quartz crucible.
  ② The crucible containing the sample is heated to calcine the sample, thereby obtaining a decomposition product.
  ③ To the decomposition product obtained in step ② above is added 2 ml of 35% hydrochloric acid solution. Then, the resultant mixture is heated on a hot plate to dissolve the decomposition product, thereby obtaining a solution.
  ④ 0.1 ml of an aqueous 1 ppm indium (In) solution is added to the obtained solution as an internal standard.
  ⑤ Water is added to the mixture obtained in step ④ above so that the final volume of the solution becomes 25 ml.
  ⑥ The solution obtained in step ⑤ is subjected to ICP-Mass spectrometry.

C. Preparation of a Calibration Curve:
  ① A series of solutions containing tungsten in various concentrations (5 to 10,000 ppb by weight) is prepared.
  ② 0.1 ml of an aqueous 1 ppm indium (In) solution as an internal standard is added to 5 g of each of the standard solutions prepared in step ①, thereby obtaining mixed solutions.
  ③ Water is added to the thus obtained solutions so that the volume of each solution becomes 25 ml.
  ④ The resultant solutions are subjected to ICP-Mass spectrometry so as to prepare a calibration curve.

D. Determination of a Heteropolyacid Content:
  The tungsten concentration of a sample is determined by using the calibration curve for tungsten.

EXAMPLE 1

(Continuous Production of an Oxytetramethylene Glycol Copolymer)

1 liter of tetrahydrofuran (THF) containing not more than 120 ppm of water and 53.3 g of neopentyl glycol (NPG) were added to a 2-liter separable flask and stirred at room temperature, to thereby obtain a solution. To the obtained solution was added 650 g of phosphotungstic acid hexahydrate as a heteropolyacid (HPA) catalyst and stirred at room temperature for approximately 1 hour, thereby obtaining a mixture. The obtained mixture was allowed to stand still so that the mixture was separated into a lower catalyst phase and an upper organic phase.

Figure 2:
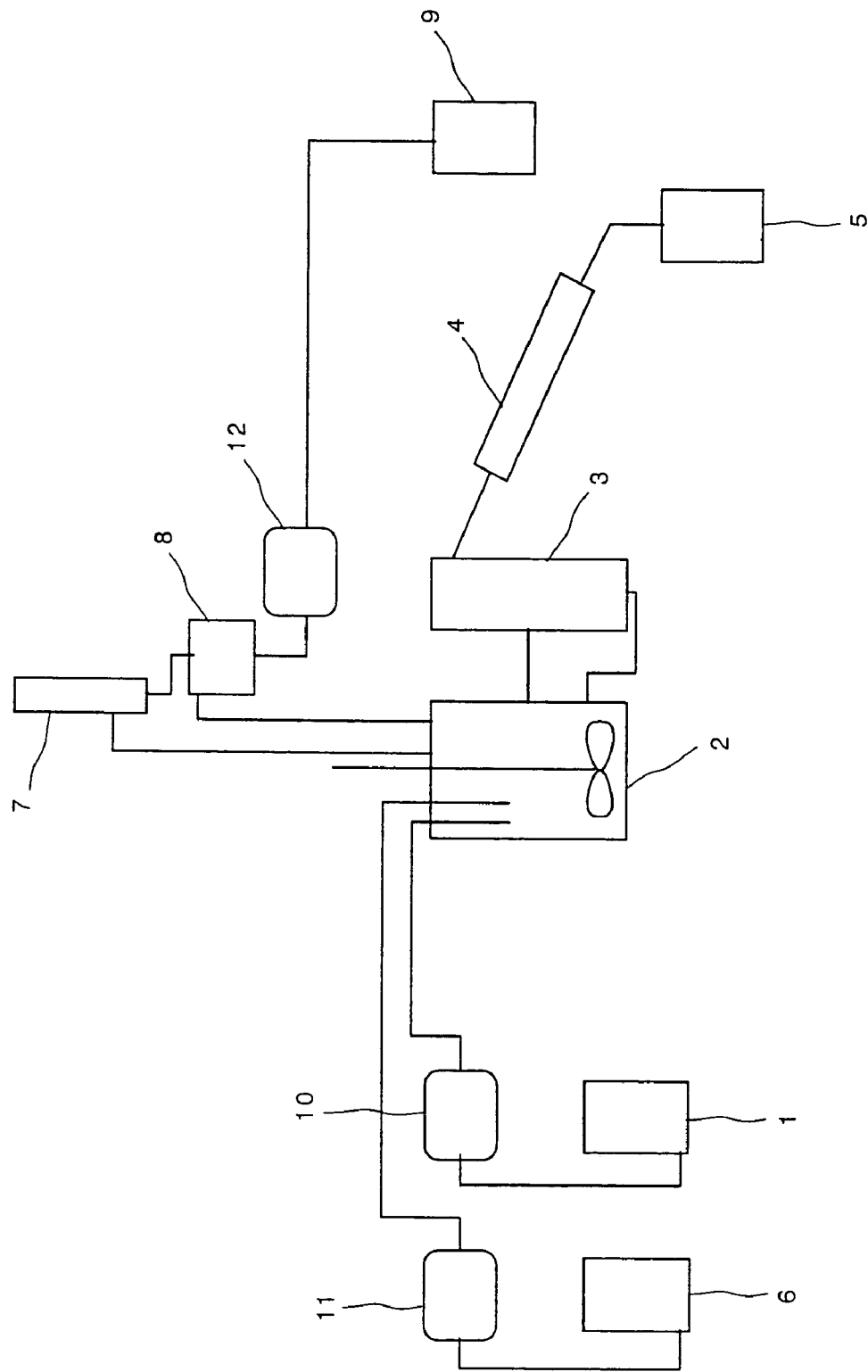
FIG. 2 is a schematic diagram showing an example of the continuous production system used for producing the oxytetramethylene glycol copolymer of the present invention.
Figure 3:
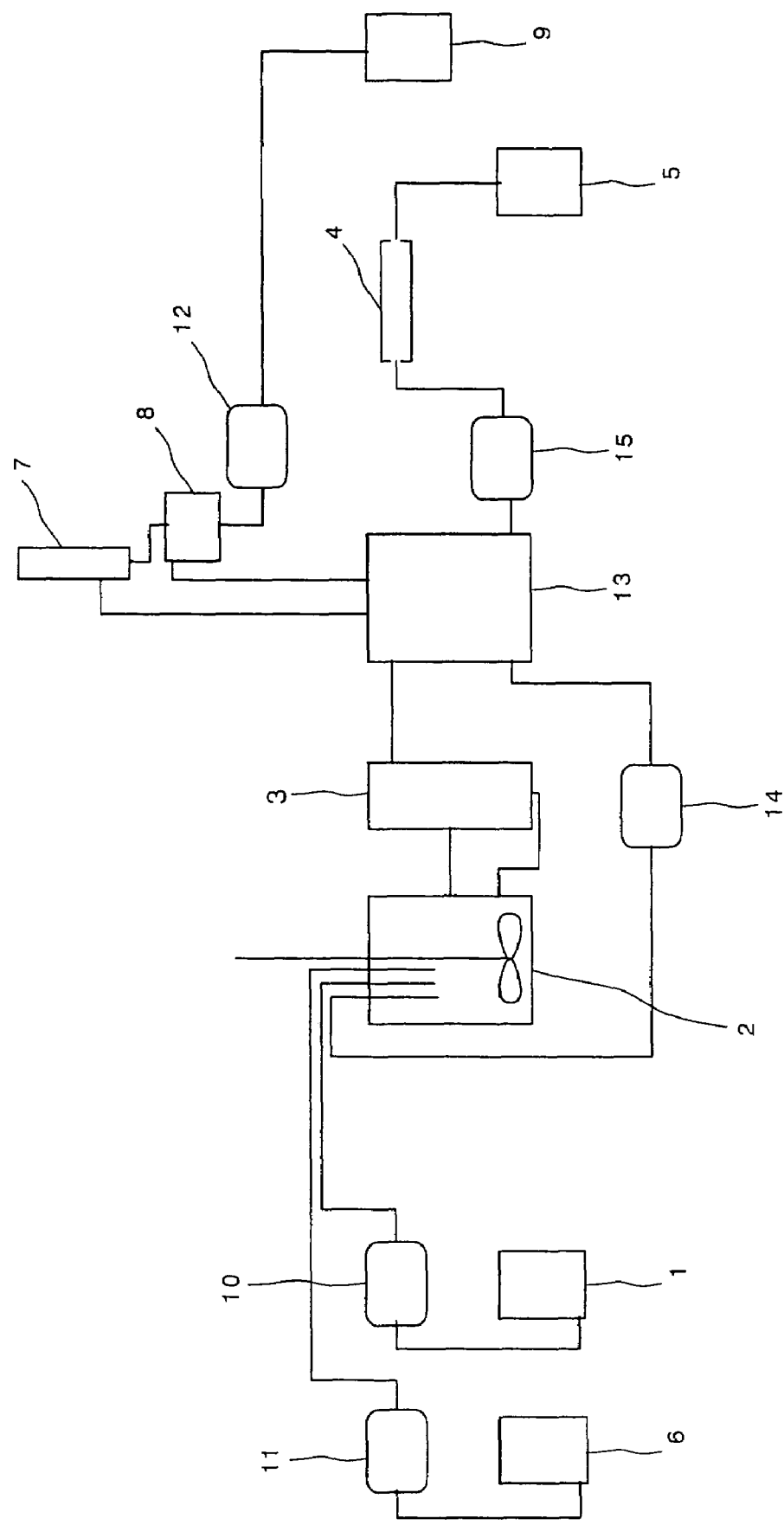
FIG. 3 is a schematic diagram showing another example of the continuous production system used for producing the oxytetramethylene glycol copolymer of the present invention.

An oxytetramethylene glycol copolymer was produced using the production system shown in FIG. 2.

The catalyst phase prepared above was charged into reactor 2. Subsequently, reactor 2 containing the catalyst phase was filled with the organic phase prepared above and the excess organic phase was allowed to flow into catalyst separation vessel 3 which was connected to reactor 2. Reactor 2 was equipped with a baffle and two turbine blades. The whole system shown in FIG. 2 was purged with nitrogen gas and the reaction was initiated by stirring (the motive power applied to the liquid per unit volume of the reactor was 5.6 kW/m$^3$) the organic phase and the catalyst phase in the reactor while heating the reactor to a temperature in the range of from 66 to 69° C. Subsequently, raw material tank 1 was charged with a THF solution obtained by dissolving 1,218 g of NPG and 266 g of phosphtungstic acid hexahydrate in 12,516 g of THF and the THF solution was fed from raw material tank 1 to reactor 2 at a flow rate of 79 ml/hr. The resultant reaction mixture in reactor 2 was circulated between reactor 2 and catalyst separation vessel 3 as follows. The reaction mixture was fed to catalyst separation vessel 3 from reactor 2 and separated into two phases, namely an upper reaction-formed organic phase and a lower reaction-formed catalyst phase. The lower reaction-formed catalyst phase was returned to reactor 2, while the upper reaction-formed organic phase was flowed up and collected in organic phase receiving vessel 5 after passing through refrigerator 4. Water by-produced during the copolymerization reaction was removed by withdrawing an azeotropic vapor of water and THF from reactor 2. The withdrawn azeotropic vapor was condensed using condensing means 7 to thereby obtain a THF/water mixture, and the obtained THF/water mixture was collected in THF/water receiving tank 8. The THF/water mixture was withdrawn from THF/water receiving tank 8 at a constant rate by using pump 12 and fed into THF/water storage tank 9. THF (water content: 120 ppm or less) was fed to reactor 2 from THF tank 6 by using pump 11 so that the amount of THF fed to reactor 2 was the same as the amount of THF withdrawn from reactor 2 as the azeotropic vapor. THF was fed to reactor 2 at a feeding rate which was the same as the withdrawing rate of THF/water mixture by pump 12.

The reaction system was operated in the abovementioned manner so as to maintain the volume of the reaction mixture in reactor 2 at 610 ml, the volume of the catalyst phase in reactor 2 at 330 ml (thus, the ratio of the volume of the catalyst phase to the total volume of the liquid in the reactor became 0.54), the NPG concentration of the organic phase at 0.80% and the specific gravity of the catalyst phase at 2.15. When the reaction temperature became stable at 68° C., the continuous polymerization reactor (reactor 2) was operated continuously for 33 hours. Subsequently, an oxytetramethylene glycol copolymer was produced by operating the reactor for 100 hours. The resultant copolymerization reaction mixture was separated into an upper reaction-formed organic phase and a lower reaction-formed catalyst phase in catalyst separation vessel 3 and only the reaction-formed organic phase was collected in organic phase receiving vessel 5. The organic phase recovered in organic phase receiving vessel 5 was used as a reaction-formed organic phase containing an oxytetramethylene glycol copolymer.

0.5 wt % of water and 4.0 wt % of calcium hydroxide, each based on the weight of the reaction-formed organic phase, were added to the reaction-formed organic phase and stirred for approximately 1 hour, to thereby precipitate the residual phosphotungstic acid as a calcium salt thereof. The precipitate was filtered off by using a membrane filter (pore diameter: 0.2 μm) made of polytetrafluoroethylene, thereby obtaining a filtrate. Unreacted low boiling point components (raw material THF and the like) contained in the filtrate were distilled off at 80° C. under 10 Torr or less, thereby obtaining a crude oxytetramethylene glycol copolymer. Approximately 5 g of the obtained crude oxytetramethylene glycol copolymer was placed in a 50 ml eggplant type flask and heated at 120° C. under 0.05 Torr or less for 5 minutes while slowly rotating the eggplant type flask, to thereby remove the unreacted NPG. As a result, an oxytetramethylene glycol copolymer was obtained.

The obtained oxytetramethylene glycol copolymer had a number average molecular weight of 1610 and an NPG copolymerization whole ratio $N_w$ of 15.6 mol %.

Next, the remainder of the crude oxytetramethylene glycol copolymer was subjected to a preparative GPC to thereby obtain a high molecular weight-side 15 wt % fraction. The NPG copolymerization partial ratio $N_h$ of the obtained high molecular weight-side 15 wt % fraction was 9.9 mol %.

The melting point and glass transition temperature of the obtained oxytetramethylene glycol copolymer are shown in Table 2, together with other properties of the oxytetramethylene glycol copolymer.

EXAMPLES 2 TO 8

An oxytetramethylene glycol copolymer was produced in substantially the same manner as in Example 1, except that the reaction conditions (composition of the raw material liquid containing THF, NPG and phosphotungstic acid hexahydrate (HPA), feeding rate of the raw material liquid (F), volume of the liquid in the reactor (V), volume of the catalyst phase (CV), specific gravity of the catalyst phase, NPG concentration, motive power applied to the liquid per unit volume thereof (P/V) and time required for stably operating the reaction system (Hr)) which are shown in Table 1 were employed. The properties of the produced oxytetramethylene glycol copolymer are shown in Table 2.

TABLE 1

| Ex. | Composition of the raw material liquid (% by weight) | | | Feeding rate of the raw material liquid: F (ml/Hr) | Volume of the liquid in the reactor: V (ml) | Volume of the catalyst phase: CV (ml) | Ratio of the volume of the catalyst phase to the volume of the liquid in the reactor: CV/V | Specific gravity of the catalyst phase | NPG concentration (% by weight) | Motive power applied to the liquid per unit volume thereof: P/V (kW/m³) | Time required for stably operating the reaction system (Hr) |
|---|---|---|---|---|---|---|---|---|---|---|---|
| | THF | HPA | NPG | | | | | | | | |
| 1 | 89.4 | 1.9 | 8.7 | 79.0 | 610 | 330 | 0.54 | 2.15 | 0.80 | 5.6 | 33 |
| 2 | 93.4 | 1.0 | 5.6 | 48.5 | 630 | 307 | 0.49 | 2.19 | 0.23 | 5.5 | 33 |
| 3 | 95.6 | 1.0 | 3.4 | 75.0 | 620 | 360 | 0.58 | 2.12 | 0.11 | 5.6 | 33 |
| 4 | 92.9 | 1.6 | 5.5 | 75.0 | 630 | 370 | 0.59 | 2.00 | 1.47 | 5.5 | 33 |
| 5 | 89.4 | 1.9 | 8.7 | 79.0 | 630 | 410 | 0.65 | 1.91 | 2.10 | 5.5 | 33 |
| 6 | 86.9 | 0.8 | 12.3 | 75.0 | 620 | 380 | 0.61 | 1.99 | 3.40 | 5.6 | 33 |
| 7 | 95.5 | 0.5 | 4.0 | 41.0 | 610 | 320 | 0.52 | 2.20 | 0.07 | 5.6 | 45 |
| 8 | 89.0 | 1.9 | 9.1 | 38.0 | 620 | 330 | 0.53 | 2.21 | 0.10 | 5.6 | 50 |

TABLE 2

| Ex. | Number average molecular weight Mn | Molecular weight distribution Mw/Mn | $\alpha^{1)}$ | NPG copolymerization ratio (mol %) | | $N_w^{1.11}$ | $Mn^{0.3}$ | $\beta^{2)}$ | Melting point (° C.) | Glass transition temperature (° C.) |
|---|---|---|---|---|---|---|---|---|---|---|
| | | | | $N_w$ | $N_h$ | | | | | |
| 1 | 1610 | 1.62 | — | 15.6 | 9.9 | 21.104170 | 9.16321 | 0.0512 | −4.1 | −86.9 |
| 2 | 1889 | 1.94 | 0.00119 | 10.1 | 5.5 | 13.025560 | 9.61323 | 0.0439 | 9.1 | −87.1 |
| 3 | 1785 | 1.82 | $3.9 \times 10^{-8}$ | 6.2 | 3.2 | 7.578003 | 9.45129 | 0.0447 | 16.8 | −87.2 |
| 4 | 1046 | 1.87 | 0.47541 | 11.4 | 6.0 | 14.899240 | 8.05117 | 0.0504 | 3.6 | −87.9 |
| 5 | 907 | 1.74 | — | 16.6 | 9.5 | 22.611010 | 7.71404 | 0.0542 | 3.3 | −88.6 |
| 6 | 1079 | 1.50 | — | 23.4 | 15.0 | 33.100120 | 8.12655 | 0.0557 | none | −85.1 |
| 7 | 2516 | 2.81 | 0.08194 | 6.3 | 3.9 | 7.713793 | 10.47640 | 0.0483 | 19.8 | −85.9 |
| 8 | 2411 | 2.90 | 0.48004 | 10.5 | 7.5 | 13.599410 | 10.34330 | 0.0533 | 18.2 | −85.9 |

1) $\alpha = \dfrac{10^{12} \times (Mw/Mn - 1.8)^{5.95}}{\exp(Mn \times 1.2/100)} \leq 1.100$ 2) $\beta = N_h/N_w^{1.11}/Mn^{0.3}$

COMPARATIVE EXAMPLE 1

An oxytetramethylene glycol copolymer was produced using a 2-liter separable flask equipped with a fractional distillation apparatus (comprising a fractionation column, a refrigerator, a reflux valve and the like), a stirrer and an inlet for feeding THF. 220 g of THF and 185 g of NPG were added to the separable flask and stirred to thereby obtain a homogeneous solution. To the thus obtained solution was added 500 g of phosphotungstic acid hexahydrate (as a catalyst) while stirring, to thereby dissolve the catalyst in the solution. The separable flask was immersed in an oil bath maintained at 100° C. and nitrogen gas was fed to the flask at a feeding rate of 10 ml/min from the upper portion of the refrigerator attached thereto. The inner pressure of the separable flask was maintained at 0.2 kg/cm²·G by providing the flask with an exhaust valve which was adapted to be opened when the inner pressure of the separable flask reaches 0.2 kg/cm²·G. The point in time when the temperature of the reaction system reached 85° C. was regarded as the point in time of the initiation of the reaction. Thereafter, the temperature of the reaction mixture was maintained at 85° C. by feeding THF to the separable flask. 40 Minutes after the initiation of the reaction, the bottom temperature of the fractionation column was adjusted to approximately 70° C. to thereby initiate the fractional distillation of water-containing THF. The copolymerization reaction was continued for 14 hours in the above-mentioned manner. During the copolymerization reaction, the reaction mixture began to separate into a catalyst phase and an organic phase. A change was observed in the dispersion of the catalyst phase in the reaction mixture and the viscosity of the separated catalyst phase increased in accordance with the progress of the copolymerization reaction.

After the termination of the reaction, the stirring of the reaction mixture was discontinued and the reaction mixture was allowed to stand still for 20 minutes to thereby separate the reaction mixture into two phases, namely an upper reaction-formed organic phase and a lower reaction-formed catalyst phase. 640 g of the upper reaction-formed organic phase was recovered from the flask while leaving 340 cc of the lower reaction-formed catalyst phase in the flask. To 640 g of the upper reaction-formed organic phase was added 5 g of calcium hydroxide and stirred at room temperature for approximately 1 hour to precipitate the residual catalyst and, then, the precipitate was filtered off by using a filter. THF contained in the thus obtained filtrate was distilled off at 60° C. under 10 Torr to thereby obtain a crude oxytetramethylene glycol copolymer. 10 g of the obtained crude oxytetramethylene glycol copolymer was placed in a 100 ml eggplant type flask and heated at 120° C. under 0.1 Torr or less for 5 minutes, to thereby remove the unreacted NPG. As a result, an oxytetramethylene glycol copolymer was obtained.

The obtained oxytetramethylene glycol copolymer had a number average molecular weight of 1820 and an NPG copolymerization whole ratio $N_w$ of 30 mol %. The concentration of the residual NPG was not less than 1% by weight. The α value (represented by formula (I)) of the oxytetramethylene glycol copolymer was $2.0 \times 10^{-4}$ and, thus, the oxytetramethylene glycol copolymer satisfied a requirement of the present invention. However, the β value (represented by formula (II)) of the oxytetramethylene glycol copolymer was 0.0567 and, thus, the oxytetramethylene glycol copolymer did not satisfy another requirement of the present invention. Other properties of the obtained oxytetramethylene glycol copolymer are shown in Table 3.

COMPARATIVE EXAMPLE 2

An oxytetramethylene glycol copolymer was produced using a 2-liter separable flask equipped with a fractional distillation apparatus (comprising a fractionation column, a refrigerator, a reflux valve and the like), a stirrer and an inlet for feeding THF. 220 g of THF and 150 g of NPG were added to the separable flask and stirred to thereby obtain a homogeneous solution. To the thus obtained solution was added 500 g of phosphotungstic acid hexahydrate (as a catalyst) while stirring, to thereby dissolve the catalyst in the solution. The separable flask was immersed in an oil bath maintained at 85° C. and nitrogen gas was fed to the flask at a feeding rate of 10 ml/min from the upper portion of the refrigerator attached thereto. The inner pressure of the separable flask was maintained at 0.2 kg/cm²·G by providing the flask with an exhaust valve which was adapted to be opened when the inner pressure of the separable flask reaches 0.2 kg/cm²·G. The point in time when the temperature of the reaction system reached 85° C. was regarded as the point in time of the initiation of the reaction. Thereafter, the temperature of the reaction mixture was maintained at 74° C. by feeding THF to the separable flask. 40 Minutes after the initiation of the reaction, the bottom temperature of the fractionation column was adjusted to approximately 70° C. to thereby initiate the fractional distillation of water-containing THF. The copolymerization reaction was continued for 18 hours in the above-mentioned manner. During the copolymerization reaction, the reaction mixture began to separate into a atalyst phase and an organic phase. A change was observed in the dispersion of the catalyst phase in the reaction mixture and the viscosity of the separated catalyst phase increased in accordance with the progress of the copolymerization reaction.

After the termination of the reaction, the stirring of the reaction mixture was discontinued and the reaction mixture was allowed to stand still for 20 minutes to thereby separate the reaction mixture into two phases, namely an upper reaction-formed organic phase and a lower reaction-formed catalyst phase. 740 g of the upper reaction-formed organic phase was recovered from the flask while leaving 340 cc of the lower reaction-formed catalyst phase in the flask. To 640 g of the upper reaction-formed organic phase was added 7 g of calcium hydroxide and stirred at room temperature for approximately 1 hour to precipitate the residual catalyst and, then, the precipitate was filtered off by using a filter. THF contained in the thus obtained filtrate was distilled off at 60° C. under 10 Torr to thereby obtain a crude oxytetramethylene glycol copolymer. 10 g of the obtained crude oxytetramethylene glycol copolymer was placed in a 100 ml eggplant type flask and heated at 120° C. under 0.1 Torr or less for 5 minutes, to thereby remove the unreacted NPG. As a result, an oxytetramethylene glycol copolymer was obtained.

The obtained oxytetramethylene glycol copolymer had a number average molecular weight of 1800 and an NPG copolymerization whole ratio $N_w$ of 21 mol %. The concentration of the residual NPG was not less than 1% by weight. The $\alpha$ value (represented by formula (I)) of the oxytetramethylene glycol copolymer was $3.2 \times 10^{-8}$ and, thus, the oxytetramethylene glycol copolymer satisfied a requirement of the present invention. However, the $\beta$ value (represented by formula (II)) of the oxytetramethylene glycol copolymer was 0.0568 and, thus, the oxytetramethylene glycol copolymer did not satisfy another requirement of the present invention. Other properties of the obtained oxytetramethylene glycol copolymer are shown in Table 3.

COMPARATIVE EXAMPLE 3

An oxytetramethylene glycol copolymer was produced using a 2-liter separable flask equipped with a fractional distillation apparatus (comprising a fractionation column, a refrigerator, a reflux valve and the like), a stirrer and an inlet for feeding THF. 200 g of THF and 150 g of NPG were added to the separable flask and stirred to thereby obtain a homogeneous solution. To the thus obtained solution was added 500 g of phosphotungstic acid hexahydrate (as a catalyst) while stirring, to thereby dissolve the catalyst in the solution. The separable flask was immersed in an oil bath maintained at 85° C. and nitrogen gas was fed to the flask at a feeding rate of 10 ml/mm from the upper portion of the refrigerator attached thereto. The inner pressure of the separable flask was maintained at 0.2 kg/cm²·G by providing the flask with an exhaust valve which was adapted to be opened when the inner pressure of the separable flask reaches 0.2 kg/cm²·G. The point in time when the temperature of the reaction system reached 74° C. was regarded as the point in time of the initiation of the reaction. Thereafter, the temperature of the reaction mixture was maintained at 74° C. by feeding THE to the separable flask. 40 Minutes after the initiation of the reaction, the bottom temperature of the fractionation column was adjusted to approximately 70° C. to thereby initiate the fractional distillation of water-containing THE. The copolymerization reaction was continued for 18 hours in the above-mentioned manner. During the copolymerization reaction, the reaction mixture began to separate into a catalyst phase and an organic phase. A change was observed in the dispersion of the catalyst phase in the reaction mixture and the viscosity of the separated catalyst phase increased in accordance with the progress of the copolymerization reaction.

After the termination of the reaction, the stirring of the reaction mixture was discontinued and the reaction mixture was allowed to stand still for 20 minutes to thereby separate the reaction mixture into two phases, namely an upper reaction-formed organic phase and a lower reaction-formed catalyst phase. 920 g of the upper reaction-formed organic phase was recovered from the flask while leaving 340 cc of the lower reaction-formed catalyst phase in the flask. To 640 g of the upper reaction-formed organic phase was added 9 g of calcium hydroxide and stirred at room temperature for approximately 1 hour to precipitate the residual catalyst and, then, the precipitate was filtered off by using a filter. THF contained in the thus obtained filtrate was distilled off at 60° C. under 10 Torr to thereby obtain a crude oxytetramethylene glycol copolymer. 10 g of the obtained crude oxytetramethylene glycol copolymer was placed in a 100 ml eggplant type flask and heated at 120° C. under 0.1 Torr or less for 5 minutes, to thereby remove the unreacted NPG. As a result, an oxytetramethylene glycol copolymer was obtained.

The obtained oxytetramethylene glycol copolymer had a number average molecular weight of 1750 and an NPG copolymerization whole ratio $N_w$ of 10 mol %. The concentration of the residual NPG was 500 ppm. The molecular weight distribution Mw/Mn of the obtained oxytetramethylene glycol copolymer was 1.8 and, thus, the oxytetramethylene glycol copolymer satisfied a requirement of the present invention. However, the $\beta$ value (represented by formula (II)) of the oxytetramethylene glycol copolymer was 0.0562 and, thus, the oxytetramethylene glycol copolymer did not satisfy another requirement of the present invention. Other properties of the obtained oxytetramethylene glycol copolymer are shown in Table 3.

COMPARATIVE EXAMPLE 4

An oxytetramethylene glycol copolymer was produced using a 2-liter separable flask equipped with a fractional distillation apparatus, a stirrer and an inlet for feeding THF. 920 g of THF and 80 g of NPG were added to the separable flask and stirred to thereby obtain a homogeneous solution. To the thus obtained solution was added 600 g of phosphotungstic acid hexahydrate (as a catalyst) while stirring, to thereby dissolve the catalyst in the solution. The separable flask was immersed in an oil bath maintained at 75° C. while stirring the solution in the flask for 15 hours, to thereby perform the copolymerization reaction. The excess amount of by-produced water (i.e., remainder of the by-produced water after consuming a part of water for forming the polymer terminals) was removed together with THF from the reaction system by fractional distillation. The distillate (THF/water mixture) was fed to the bottom of an adsorption column made of glass (diameter: 44 mm, height: 100 mm) which was packed with 200 g of molecular sieves type 3A, to thereby remove water by adsorption. The water-removed mixture (mainly composed of THF) was withdrawn from the top of the adsorption column and returned to the reaction system. Before feeding the distillate to the adsorption column, the adsorption column was filled with THF having a water content of not more than 50 ppm. Approximately 2.4 kg of the distillate was obtained after performing the reaction for 15 hours.

After the termination of the reaction, the stirring of the reaction mixture was discontinued and the reaction mixture was allowed to stand still to thereby separate the reaction mixture into two phases, namely an upper reaction-formed organic phase and a lower reaction-formed catalyst phase. The upper reaction-formed organic phase was recovered by decantation. To the recovered upper reaction-formed organic phase was added calcium hydroxide, to thereby precipitate the residual catalyst. The precipitate was filtered off by using a filter, thereby obtaining a filtrate. THF and NPG contained in the filtrate were removed by distillation to thereby obtain a viscous oxytetramethylene glycol copolymer.

The obtained oxytetramethylene glycol copolymer had a number average molecular weight of 1730 and an NPG copolymerization whole ratio $N_w$ of 13 mol %. The concentration of the residual NPG was 800 ppm. The α value (represented by formula (I)) of the oxytetramethylene glycol copolymer was $1.2 \times 10^{-8}$ and, thus, the oxytetramethylene glycol copolymer satisfied a requirement of the present invention. However, the β value (represented by formula (II)) of the oxytetramethylene glycol copolymer was 0.0564 and, thus, the oxytetramethylene glycol copolymer did not satisfy another requirement of the present invention. Other properties of the obtained oxytetramethylene glycol copolymer are shown in Table 3.

COMPARATIVE EXAMPLE 5

An oxytetramethylene glycol copolymer was produced using a 2-liter separable flask equipped with a fractional distillation apparatus, a stirrer and an inlet for feeding THF. 900 g of THF and 51 g of NPG were added to the separable flask and stirred to thereby obtain a homogeneous solution. To the thus obtained solution was added 510 g of phosphotungstic acid hexahydrate (as a catalyst) while stirring, to thereby dissolve the catalyst in the solution. The separable flask was immersed in an oil bath maintained at 75° C. while stirring the solution in the flask for 10 hours, to thereby perform the copolymerization reaction. The excess amount of by-produced water (i.e., remainder of the by-produced water after consuming a part of water for forming the polymer terminals) was removed together with THF from the reaction system by fractional distillation. THF was continuously fed to the flask so that the amount of THF fed to the flask was the same as the amount of THF withdrawn from the flask as a distillate.

After the termination of the reaction, the stirring of the reaction mixture was discontinued and the reaction mixture was allowed to stand still to thereby separate the reaction mixture into two phases, namely an upper reaction-formed organic phase and a lower reaction-formed catalyst phase. The upper reaction-formed organic phase was recovered by decantation. To the recovered upper reaction-formed organic phase was added 8 g of calcium hydroxide, and stirred for 30 minutes. The resultant mixture was allowed to stand still for 1 day and night to thereby precipitate the residual catalyst. The precipitate was filtered off by using a filter, thereby obtaining a filtrate. THF contained in the filtrate was removed by fractional distillation at 40° C. under 20 Torr. Subsequently, the still residue was allowed to stand still at 120° C. under 0.1 Torr or less for 5 minutes under conditions wherein the thickness of the polymer film became 1 cm or less, thereby removing NPG from the still residue. As a result, 180 g of a viscous copolymer was obtained.

The obtained oxytetramethylene glycol copolymer had a number average molecular weight of 1720 and an NPG copolymerization whole ratio $N_w$ of 10 mol %. The concentration of the residual NPG was 600 ppm. The α value (represented by formula (I)) of the oxytetramethylene glycol copolymer was $8.5 \times 10^{-8}$ and, thus, the oxytetramethylene glycol copolymer satisfied a requirement of the present invention. However, the β value (represented by formula (II)) of the oxytetramethylene glycol copolymer was 0.0565 and, thus, the oxytetramethylene glycol copolymer did not satisfy another requirement of the present invention. Other properties of the obtained oxytetramethylene glycol copolymer are shown in Table 3.

TABLE 3

| Compara. Ex. | Number average molecular weight Mn | Molecular weight distribution Mw/Mn | $\alpha^{1)}$ | NPG copolymerization ratio (mol %) $N_w$ | $N_h$ | $N_w^{1.11}$ | $Mn^{0.3}$ | $\beta^{2)}$ | Melting point (° C.) | Glass transition temperature (° C.) |
|---|---|---|---|---|---|---|---|---|---|---|
| 1 | 1820 | 1.89 | $2.0 \times 10^{-4}$ | 30 | 23.5 | 33.25717 | 9.50652 | 0.0567 | none | −75.0 |
| 2 | 1800 | 1.82 | $3.2 \times 10^{-8}$ | 21 | 15.8 | 21.40471 | 9.47506 | 0.0568 | none | −83.3 |
| 3 | 1750 | 1.80 | — | 10 | 6.8 | 8.39624 | 9.39532 | 0.0562 | 9.7 | −85.9 |
| 4 | 1730 | 1.81 | $1.2 \times 10^{-8}$ | 13 | 9.1 | 11.60208 | 9.36297 | 0.0564 | 2.5 | −85.1 |
| 5 | 1720 | 1.82 | $8.5 \times 10^{-8}$ | 10 | 6.8 | 8.39624 | 9.34670 | 0.0565 | 8.9 | −85.7 |

$$^{1)} \alpha = \frac{10^{12} \times (Mw/Mn - 1.8)^{5.95}}{\exp(Mn \times 1.2/100)} \leq 1.100$$

$^{2)} \beta = N_h / N_w^{1.11} / Mn^{0.3}$

COMPARATIVE EXAMPLES 6 TO 8

(Continuous Polymerization Using a Catalyst Phase Having a Specific Gravity of Less than 1.8)

An oxytetramethylene glycol copolymer was produced in substantially the same manner as in Example 1, except that the reaction conditions (composition of the raw material liquid containing THF, NPG and phosphotungstic acid hexahydrate (HPA), feeding rate of the raw material liquid (F), volume of the liquid in the reactor (V), volume of the catalyst phase (CV), specific gravity of the catalyst phase, NPG concentration, motive power applied to the liquid per unit volume thereof (P/V) and time required for stably operating the reaction system (Hr)) which are shown in Table 4 were employed. The properties of the produced oxytetramethylene glycol copolymer are shown in Table 5.

As apparent from Table 5 below, each of the copolymers obtained in Comparative Examples 6 to 8 had the β value (represented by formula (II)) satisfying a requirement of the present invention. However, the α value (represented by formula (I)) of each of the copolymers did not satisfy another requirement of the present invention.

TABLE 4

| Compara. Ex. | Composition of the raw material liquid (wt %) | | | Feeding rate of the raw material liquid: | Volume of the liquid in the reactor: | Volume of the catalyst phase: | Ratio of the volume of the catalyst phase to the volume of the liquid in the reactor: | Specific gravity of the catalyst phase | NPG concentration (wt %) | Motive power applied to the liquid per unit volume thereof: P/V | Time required for stably operating the reaction system |
|---|---|---|---|---|---|---|---|---|---|---|---|
| | THF | HPA | NPG | F (ml/Hr) | V (ml) | CV (ml) | CV/V | | | (kW/m³) | (Hr) |
| 6 | 93.3 | 5.9 | 0.8 | 10 | 630 | 450 | 0.714 | 1.79 | 0.4 | 5.5 | 180 |
| 7 | 89.3 | 8.9 | 1.8 | 12 | 620 | 430 | 0.693 | 1.79 | 1.1 | 5.6 | 150 |
| 8 | 92.9 | 6.0 | 1.1 | 24 | 620 | 430 | 0.693 | 1.77 | 3.3 | 5.6 | 100 |

TABLE 5

| Compara. Ex. | Number average molecular weight Mn | Molecular weight distribution Mw/Mn | $\alpha^{1)}$ | NPG copolymerization ratio (mol %) | | $N_w^{1.11}$ | $Mn^{0.3}$ | $\beta^{2)}$ | Melting point (° C.) | Glass transition temperature (° C.) |
|---|---|---|---|---|---|---|---|---|---|---|
| | | | | $N_w$ | $N_h$ | | | | | |
| 6 | 1840 | 2.20 | 1.10417 | 10.5 | 6.0 | 7.30715 | 9.53774 | 0.04625 | 10.2 | −85.0 |
| 7 | 1680 | 2.23 | 11.58140 | 15.9 | 10.1 | 13.02557 | 9.28096 | 0.05048 | −3.1 | −84.8 |
| 8 | 1089 | 2.05 | 552.56400 | 12.3 | 6.8 | 8.39624 | 8.14908 | 0.05147 | 3.9 | −86.1 |

$$^{1)} \alpha = \frac{10^{12} \times (Mw/Mn - 1.8)^{5.95}}{\exp(Mn \times 1.2/100)} \le 1.100$$

$$^{2)} \beta = N_h/N_w^{1.11}/Mn^{0.3}$$

EXAMPLE 9

(A Method in which the Copolymerization Reaction is Performed in the Same Manner as in Example 1, but the Catalyst Removal is Performed without Using Ca(OH)$_2$)

1 liter of tetrahydrofuran (THF) containing not more than 120 ppm of water and 53.3 g of neopentyl glycol (NPG) were added to a 2-liter separable flask and stirred at room temperature, to thereby obtain a solution. To the obtained solution was added 650 g of phosphotungstic acid hexahydrate as a heteropolyacid (HPA) catalyst and stirred at room temperature for approximately 1 hour, thereby obtaining a mixture. The obtained mixture was allowed to stand still so that the mixture was separated into a lower catalyst phase and an upper organic phase.

An oxytetramethylene glycol copolymer was produced using a continuous production system shown in FIG. 2.

The catalyst phase prepared above was charged into reactor 2. Subsequently, reactor 2 containing the catalyst phase was filled with the organic phase prepared above and the excess organic phase was allowed to flow into catalyst separation vessel 3 which was connected to reactor 2. Reactor 2 was equipped with a baffle and two turbine blades. The whole system shown in FIG. 2 was purged with nitrogen gas and the reaction was initiated by stirring the organic phase and the catalyst phase in the reactor while heating the reactor to a temperature in the range of from 66 to 69° C. Subsequently, raw material tank 1 was charged with a THF solution obtained by dissolving 1,218 g of NPG and 266 g of phosphtungstic acid hexahydrate in 12,516 g of THF and the THF solution was fed from raw material tank 1 to reactor 2 at a flow rate of 79 ml/hr. The resultant reaction mixture in reactor 2 was circulated between reactor 2 and catalyst separation vessel 3 as follows. The reaction mixture was fed to catalyst separation vessel 3 from reactor 2 and separated into two phases, namely an upper reaction-formed organic phase and a lower reaction-formed catalyst phase. The lower reaction-formed catalyst phase was returned to reactor 2, while the upper reaction-formed organic phase was flowed up and collected in organic phase receiving vessel 5 after passing through refrigerator 4. Water by-produced during the copolymerization reaction was removed by withdrawing an azeotropic vapor of water and THF from reactor 2. The withdrawn azeotropic vapor was condensed using condensing means 7 to thereby obtain a THF/water mixture, and the obtained THF/water mixture was collected in THF/water receiving tank 8. The THF/water mixture was withdrawn from THF/water receiving tank 8 at a constant rate by using pump 12 and fed into THF/water storage tank 9. THF (water content: 120 ppm or less) was fed to reactor 2 from THF tank 6 by using pump 11 so that the amount of THF fed to reactor 2 was the same as the amount of THF withdrawn from reactor 2 as the azeotropic vapor. THF was fed to reactor 2 at a feeding rate which was the same as the withdrawing rate of THF/water mixture by pump 12.

The reaction system was operated in the abovementioned manner so as to maintain the volume of the reaction mixture in reactor 2 at 610 ml, the volume of the catalyst phase in reactor 2 at 330 ml, the NPG concentration of the organic phase at 0.80% and the specific gravity of the catalyst phase at 2.15. When the reaction temperature became stable at 68° C., the continuous polymerization reactor (reactor 2) was operated continuously for 33 hours. Subsequently, an oxytetramethylene glycol copolymer was produced by operating the reactor for 100 hours. The resultant copolymerization reaction mixture was separated into an upper reaction-formed organic phase and a lower reaction-formed catalyst phase in catalyst separation vessel 3 and only the reaction-formed organic phase was collected in organic phase receiving vessel 5. The organic phase recovered in organic phase receiving vessel 5 was used as a reaction-formed organic phase containing an oxytetramethylene glycol copolymer.

The volume of the liquid in the reactor was 610 ml, the volume of the catalyst phase was 330 ml, and the concentration of NPG in the organic phase of the reaction mixture was 0.80%.

5 kg of the reaction mixture was taken out from organic phase receiving vessel 5 containing the reaction-formed organic phase produced while stably operating the reaction system. THF contained in the reaction mixture was removed by fractional distillation at 50° C. under 50 mmHg so as to obtain a copolymer concentrate having a copolymer concentration of from 45 to 60% by weight.

To the obtained copolymer concentrate was added n-octane in an amount which was 1.5 times the weight of the copolymer concentrate, and the resultant mixture was stirred so as to enable the phase separation of the catalyst which was dissolved in the copolymer concentrate. Since the amount of the catalyst phase formed by the addition of n-octane was very small, after removing the lower catalyst phase from the upper organic phase, the residual catalyst dispersed in the upper organic phase was filtered off by using a membrane filter (pore diameter: 0.2 μm) made of polytetrafluoroethylene, thereby obtaining a filtrate. The obtained filtrate was a transparent liquid having a heteropolyacid concentration in terms of tungsten concentration of 8 ppm.

The filtrate (i.e., the organic phase obtained after removing the catalyst phase) was fed to a column packed with approximately 1 kg of an activated carbon, to thereby adsorb and remove a small amount of the catalyst which was dissolved in the filtrate by the activated carbon. The filtrate was fed to the column at a flow rate of 5 liters/hr by using a pump. After the treatment with the activated carbon, the reaction mixture (effluent) had a heteropolyacid (phosphotungstic acid) concentration in terms of tungsten concentration of 0.5 ppm.

Subsequently, THF was distilled off from the effluent by using an Oldershaw distillation column (number of theoretical plates: 10) at 50° C. under 440 mmHg, thereby obtaining a THF removed, oxytetramethylene glycol copolymer solution in octane. The obtained oxytetramethylene glycol copolymer solution was cooled to 40° C. so as separate the copolymer solution into an n-octane phase and an oxytetramethylene glycol copolymer phase. The oxytetramethylene glycol copolymer phase was recovered as a partially purified reaction mixture.

The partially purified reaction mixture contained 53% by weight of an oxytetramethylene glycol copolymer, 46% by weight of n-octane and 1% by weight of NPG. The number average molecular weight was 1710 and the NPG copolymerization whole ratio $N_w$ was 15.5 mol %.

EXAMPLE 10

(Two-Step Purification Method)

An oxytetramethylene glycol copolymer was purified from the partially purified reaction mixture obtained in Example 9 by using the purification system shown in FIG. 5.

The partially purified reaction mixture obtained in Example 9 was placed in reaction mixture tank 16 and the reaction mixture was fed from reaction mixture tank 16 to mixer 18 at a flow rate of 12 ml/min by using pump 17. Water was fed to mixer 18 at a flow rate of 3.2 ml/min by using pump 24 so as to mix the reaction mixture with water in mixer 18. The resultant mixture was fed to centrifugal molecular distillation apparatus 19 to thereby remove octane and other low boiling point components from the mixture at 120° C. under 50 Torr. The distillate was a mixture of low boiling point components including octane. The mixture of the low boiling point components was fed to distillation column 20 (an Oldershaw distillation column, number of theoretical plates: 20, column diameter: 50 mm, column height: 1,350 mm) to thereby distill off a mixture of octane and water from the low boiling components. The distillation was performed by feeding the mixture of the low boiling point components to the column top at a flow rate of 0.92 ml/min by using pump 34. The mixture of octane and water which was distilled off from distillation column 20 was fed to decanter 22 to thereby separate the mixture into a lower water phase and an upper octane phase. The lower water phase was recycled to either mixer 18 by using pump 24 or distillation column 20 by using pump 34. The upper octane phase was recovered in octane storage tank 23. The recovered octane can be used for the phase separation of the catalyst from the reaction-formed organic phase.

The reaction mixture treated with centrifugal molecular distillation apparatus 19 was fed to distillation column 26 (number of theoretical plates: 17, column diameter: 80 mm, column height: 1272 mm, column packing: Melapack CY) by using pump 25 at a flow rate of 6.2 ml/min. A fresh THF was fed from fresh THF tank 29 to heating means 31 at a flow rate of 20 ml/min by using pump 30 to thereby heat THF to 120° C., and the resultant gaseous THF was fed to the bottom portion of distillation column 26. The ratio of the NPG flow rate to the THF flow rate became approximately 170. Distillation column 26 was heated from the outside thereof to maintain the temperature of the inner vapor at 120° C. The degree of vacuum inside the distillation column was maintained at 450 Torr. The vapor withdrawn from the column top which was mainly composed of THF was cooled by means of condensing means 27, to thereby liquefy the vapor, and the liquefied vapor was fed to raw material tank 28. The high temperature liquid withdrawn from the bottom portion of distillation column 26 had an oxytetramethylene glycol copolymer content of 90% or more. This liquid as such was fed to centrifugal molecular distillation apparatus 32 and THF contained therein was removed at 120° C. under 0.5 Torr, thereby obtaining a purified oxytetramethylene glycol copolymer. The removed THF was recovered in raw material tank 28 and the purified oxytetramethylene glycol copolymer was recovered in oxytetramethylene glycol copolymer tank 33. When the conditions inside distillation column 26 became stable and the distillation column was filled with the copolymer, raw material tank 28 was changed to raw material tank 28' (not shown) so as to collect a THF solution composed of gaseous THF which was recovered under stable conditions.

The THF solution in raw material tank 28' (not shown) which was recovered under stable conditions had an NPG concentration of 0.6% and an octane concentration of 0.1%.

The purified oxytetramethylene glycol copolymer recovered in oxytetramethylene glycol copolymer tank 33 had an oxytetramethylene glycol copolymer content of 99% or more, an NPG content of less than 80 ppm and an n-octane content of less than 50 ppm. The number average molecular weight was 1710, the molecular weight distribution was 1.75, the NPG copolymerization whole ratio $N_w$ was 15.6 mol %, and the β value (represented by formula (II)) was 0.0543. The thermal stability of the oxytetramethylene glycol copolymer was 333° C. and the color index measured in accordance with APHA was 10.

With respect to the above-mentioned analytical results of the purified oxytetramethylene glycol copolymer, please note the following. Each of the NPG content and the n-octane content was determined by gas chromatography and the determined value was lower than the detection limit of the gas chromatography performed under conditions mentioned above. The amount of the residual THF in the purified oxytetramethylene glycol copolymer was determined in terms of the low boiling point components distilled off by heating the oxytetramethylene glycol copolymer at 80° C. under 5 Torr for 30 minutes. The oxytetramethylene glycol copolymer content of a purified oxytetramethylene glycol copolymer was determined by subtracting the total weight of THF, NPG and n-octane contained in the purified oxytetra-methylene glycol copolymer from the weight of the purified oxytetramethylene glycol copolymer.

EXAMPLE 11

(Production of an Oxytetramethylene Glycol Copolymer by Using THF and NPG Recovered in Example 10)

4 kg of the THF solution in raw material tank 28', which was recovered in Example 10, was taken out, and NPG and phosphotungstic acid hexahydrate (HPA) were added thereto in amounts such that the NPG concentration and the HPA concentration of the resultant mixture became 8.7% and 1.9%, respectively. The resultant solution was used as a raw material liquid. An oxytetramethylene glycol copolymer was produced in substantially the same manner as in Example 9 except that use was made of the above-mentioned raw material liquid. Further, since the amount of the raw material liquid was smaller than the amount used in Example 9, the reaction was performed for only 25 hours after the stabilization of the reaction conditions.

A reaction mixture was obtained in the above-mentioned manner and 1.5 kg of the obtained reaction mixture was partially purified in substantially the same manner as in Example 9 and further purified in substantially the same manner as in Example 1, thereby obtaining a purified oxytetramethylene glycol copolymer.

The purified oxytetramethylene glycol copolymer had an oxytetramethylene glycol copolymer content of 99% or more, an NPG content of less than 80 ppm and an n-octane content of less than 50 ppm. The number average molecular weight was 1780, the molecular weight distribution was 1.77, the NPG copolymerization whole ratio $N_w$ was 15.8 mol %, and the β value (represented by formula (II)) was 0.0543. The thermal stability of the oxytetramethylene glycol copolymer was 334° C. and the color index measured in accordance with APHA was 10.

With respect to the above-mentioned analytical results of the purified oxytetramethylene glycol copolymer, please note the following. Each of the NPG content and the n-octane content was determined by gas chromatography and the determined value was lower than the detection limit of the gas chromatography performed under conditions mentioned above. The amount of the residual THF in the purified oxytetramethylene glycol copolymer was determined in terms of the low boiling point components distilled off by heating the oxytetramethylene glycol copolymer at 80° C. under 5 Torr for 30 minutes. The oxytetramethylene glycol copolymer content of a purified oxytetramethylene glycol copolymer was determined by subtracting the total weight of THF, NPG and n-octane contained in the purified oxytetramethylene glycol copolymer from the weight of the purified oxytetramethylene glycol copolymer.

THF and a diol recovered by the stripping process and the centrifugal molecular distillation can be recycled without causing any adverse effects on the reaction rate and the quality of the produced oxytetramethylene glycol copolymer.

EXAMPLE 12

(One-Step Purification Method)

The copolymerization reaction was performed in substantially the same manner as in Example 9 except that the polymerization reaction under stable reaction conditions was performed for 150 hours. A part of THF contained in the thus obtained reaction mixture was removed by distillation and the catalyst contained in the reaction mixture was removed by the addition of n-octane, followed by phase separation and filtration. THF remaining in the resultant reaction mixture was removed by distillation and, then, the reaction mixture was separated into an octane phase (upper phase) and a polymer phase (lower phase). The polymer phase was recovered, thereby obtaining approximately 10 kg of a partially purified reaction mixture.

The obtained partially purified reaction mixture had an oxytetramethylene glycol copolymer content of 49%, an n-octane content of 49%, a THF content of 1% and an NPG content of 1%.

An oxytetramethylene glycol copolymer was purified from the above-obtained reaction mixture by the one-step purification method by using the purification system shown in FIG. 4.

The partially purified reaction mixture obtained above was placed in reaction mixture tank 16 and the reaction mixture was fed from reaction mixture tank 16 to distillation column 26 at a flow rate of 4.4 ml/min by using pump 24. A fresh THF was fed from fresh THF tank 29 to heating means 31 at a flow rate of 8 ml/min by using pump 30, and a gaseous THF heated to 120° C. was fed to the bottom portion of distillation column 26. The ratio of the NPG flow rate to the THF flow rate became approximately 182. Distillation column 26 was heated from the outside to maintain the temperature of the inner vapor at 120° C. The degree of vacuum inside the distillation column was maintained at 450 Torr. The vapor withdrawn from the column top which was mainly composed of THF was cooled by means of condensing means 27, to thereby liquefy the vapor, and the liquefied vapor was fed to raw material tank 28. The high temperature liquid withdrawn from the bottom portion of distillation column 26 had an oxytetramethylene glycol copolymer content of 90% or more. This liquid as such was fed to centrifugal molecular distillation apparatus 32 and THF contained therein was removed at 120° C. under 0.5 Torr, thereby obtaining a purified oxytetramethylene glycol copolymer. The removed THF was recovered in raw material tank 28 and the purified oxytetramethylene glycol copolymer was recovered in oxytetramethylene glycol copolymer tank 33. When the conditions inside distillation column 26 became stable and the column was filled with the copolymer, raw material tank 28 was changed to raw material tank 28' (not shown) so as to collect a THF solution composed of gaseous THF which was recovered under stable conditions.

The THF solution in raw material 28' (not shown) which was recovered under stable conditions had an NPG concentration of 0.5% and an octane concentration of 18%.

The purified oxytetramethylene glycol copolymer recovered in oxytetramethylene glycol copolymer tank 33 had an oxytetramethylene glycol copolymer content of 99% or more, an NPG content of less than 80 ppm and an n-octane content of less than 50 ppm. The number average molecular weight was 1800, the molecular weight distribution was 1.78, the NPG copolymerization whole ratio $N_w$ was 15.1 mol %, and the β value (represented by formula (II)) was 0.00519. Further, the thermal stability of the oxytetramethylene glycol copolymer was 333° C. and the color index measured in accordance with APHA was 10.

With respect to the above-mentioned analytical results of the purified oxytetramethylene glycol copolymer, please note the following. Each of the NPG content and the n-octane content was determined by gas chromatography and the determined value was lower than the detection limit of the gas chromatography performed under conditions mentioned above. The amount of the residual THF in the purified oxytetramethylene glycol copolymer was determined in terms of the low boiling point components distilled off by heating the oxytetramethylene glycol copolymer at 80° C. under 5 Torr for 30 minutes. The oxytetramethylene glycol copolymer content of a purified oxytetramethylene glycol copolymer was determined by subtracting the total weight of THF, NPG and n-octane contained in the purified oxytetramethylene glycol copolymer from the weight of the purified oxytetramethylene glycol copolymer.

EXAMPLE 13

(Production of an Oxytetramethylene Glycol Copolymer by Using THF Recovered in Example 12)

6 kg of THF solution in raw material tank 28', which was recovered in Example 12, was taken out and the n-octane content thereof was lowered to 1% or less by distillation. Specifically, the THF solution was fed to a continuous distillation column having a condensation zone (number of theoretical plates: 5) and a recovery zone (number of theoretical plates: 5). A mixture mainly composed of THF and n-octane was withdrawn from the top of the continuous distillation column and a mixture of NPG and oligomers (NPG/oligomer mixture) was withdrawn from the bottom of the continuous distillation column. The continuous distillation column had a column diameter of 5 cm and a column height of 1 m, and the inner pressure of the distillation column was 830 mmHg and the reflux ratio at the column top was 3. The NPG/oligomer mixture which was withdrawn from the bottom of the distillation column had an n-octane concentration of 1% or less, and the distillate withdrawn from the column top contained 81% of THF, 19% of n-octane and approximately 0.1% of NPG. The distillate was subjected to distillation in a batchwise manner by using an Oldershaw distillation column (number of theoretical plates: 10) under atmospheric pressure with reflux ratio of 4, to thereby obtain a THF solution having an n-octane content of 0.01%. 4 kg of the thus obtained THF solution was mixed with 60 g of the NPG/oligomer mixture withdrawn from the bottom of the continuous distillation column. To the resultant mixture were added NPG and phosphotungstic acid hexahydrate (HPA) in amounts such that the NPG concentration and the HPA concentration of the resultant mixture became 8.7% and 1.9%, respectively. The resultant solution was used as a raw material liquid. An oxytetramethylene glycol copolymer was produced in substantially the same manner as in Example 9 except that use was made of the above-mentioned raw material liquid. Further, since the amount of the raw material liquid was smaller than the amount used in Example 9, the reaction was performed for only 15 hours after the stabilization of the reaction conditions.

A reaction mixture was obtained in the abovementioned manner and 1.0 kg of the obtained reaction mixture was purified in substantially the same manner as in Example 3 to thereby obtain a purified oxytetramethylene glycol copolymer.

The purified oxytetramethylene glycol copolymer had an oxytetramethylene glycol copolymer content of 98% or more, an NPG content of less than 80 ppm and an n-octane content of less than 50 ppm. The number average molecular weight was 1790, the molecular weight distribution was 1.77, the NPG copolymerization whole ratio $N_w$ was 16.0 mol %, and the β value (represented by formula (II)) was 0.0516. Further, the thermal stability of the oxytetramethylene glycol copolymer was 335° C. and the color index measured in accordance with APHA was less than 10.

THF and a diol recovered by the stripping process and the centrifugal molecular distillation can be recycled without causing any adverse effects on the reaction rate and the quality of the produced oxytetramethylene glycol copolymer.

EXAMPLE 14

(Purification of a Copolymer Produced Using 1,6-Hexanediol as a Diol)

A reaction mixture containing an oxytetramethylene glycol copolymer was obtained in substantially the same manner as in Example 9 except that NPG used in Example 9 was changed to an equivalent molar amount of 1,6-hexanediol. The obtained reaction mixture contained 55% by weight of an oxytetramethylene glycol copolymer composed of THF units and 1,6-hexanediol units, 45% by weight of n-octane and 1% by weight of 1,6-hexanediol.

The above-obtained reaction mixture was purified in substantially the same manner as in Example 10, thereby obtaining a purified oxytetramethylene glycol copolymer. Specifically, the purification was performed in substantially the same manner as in Example 10 except that the flow rate of gaseous THF fed to the bottom portion of distillation column 26 was changed so that the flow rate of gaseous THF became 5.3 times the amount of 1,6-hexanediol contained in the reaction mixture (i.e., the ratio of the feeding rate of the reaction mixture to the feeding rate of gaseous THF became approximately 901). As a result, a purified oxytetramethylene glycol copolymer recovered in oxytetramethylene glycol copolymer tank 33 had an oxytetramethylene glycol copolymer content of 99% or more, a 1,6-hexanediol content of less than 80 ppm and an n-octane content of less than 50 ppm. The oxytetramethylene glycol copolymer had a number average molecular weight of 1700 and a 1,6-hexanediol copolymerization whole ratio of 15 mol %.

EXAMPLE 15

(Purification of a Copolymer Produced Using 1,3-Propanediol as a Diol)

A reaction mixture containing an oxytetramethylene glycol copolymer was obtained in substantially the same manner as in Example 9 except that NPG used in Example 9 was changed to an equivalent molar amount of 1,3-propanediol. The obtained reaction mixture contained 55% by weight of an oxytetramethylene glycol copolymer composed of THF units and 1,3-propanediol units, 45% by weight of n-octane and 1% by weight of 1,3-propanediol.

The above-obtained reaction mixture was purified in substantially the same manner as in Example 10. As a result, the purified oxytetramethylene glycol copolymer recovered in oxytetramethylene glycol copolymer tank 33 had an oxytetramethylene glycol copolymer content of 99% or more, a 1,3-propanediol content of less than 80 ppm and an n-octane content of less than 50 ppm. The oxytetramethylene glycol copolymer had a number average molecular weight of 1700 and a 1,3-propanediol copolymerization whole ratio of 15 mol %.

INDUSTRIAL APPLICABILITY

The oxytetramethylene glycol copolymer of the present invention, which is obtained by copolymerizing tetrahydrofuran and neopentyl glycol and which has a specific number average molecular weight, a specific molecular weight distribution and a specific neopentyl glycol copolymerization ratio, exhibits low melting point and low glass transition temperature. By virtue of these improved properties, the oxytetramethylene glycol copolymer of the present invention can be advantageously used as a raw material for high quality materials, such as a polyurethane, a polyurethane urea and a polyester, which have excellent low temperature properties.

Further, by the use of the method of the present invention for purifying an oxytetramethylene glycol copolymer, it has become possible to not only purify the copolymer without causing the clogging of a condensation tube and a conduit by the solidification of the diol, but also recover a recyclable diol.

The invention claimed is:

1. A method for producing an oxytetramethylene glycol copolymer having the following characteristics (1) to (4):
   (1) a number average molecular weight Mn of from 800 to 5000;
   (2) a characteristic wherein the weight average molecular weight Mw and the number average molecular weight Mn satisfy either the following (i) or the following (ii):
      (i) a molecular weight distribution of 1.8 or less in terms of the Mw/Mn ratio, or
      (ii) a molecular weight distribution of more than 1.8 in terms of the Mw/Mn ratio,
   wherein Mw and Mn satisfy the relationship defined by the following formula (I):

$$\frac{10^{12} \times (Mw/Mn - 1.8)^{5.95}}{\exp(Mn \times 1.2/100)} \leq 1.100; \quad (I)$$

(3) a neopentyl glycol copolymerization whole ratio $N_w$ of from 6 to 30 mol %, wherein said neopentyl glycol copolymerization whole ratio $N_w$ is defined as the molar percentage of the amount of neopentyl glycol monomer units present in the whole oxytetramethylene glycol copolymer, based on the total molar amount of the tetrahydrofuran monomer units and the neopentyl glycol units in said whole oxytetramethylene glycol copolymer; and
   (4) a characteristic wherein the number average molecular weight Mn, the neopentyl glycol copolymerization whole ratio $N_w$ (mol %) of the oxytetramethylene glycol copolymer, and the neopentyl glycol copolymerization partial ratio $N_h$ (mol %) of a high molecular weight-side 15 wt % fraction of said oxytetramethylene glycol copolymer satisfy the relationship defined by the following formula (II):

$$N_h/N_w^{1.1}/Mn^{0.3} < 0.0560 \quad (II),$$

wherein $N_h$ is defined as the molar percentage of the amount of neopentyl glycol monomer units present in said high molecular weight-side 15 wt % fraction, based on the total molar amount of the tetrahydrofuran monomer units and the neopentyl glycol units in said high molecular weight-side 15 wt % fraction, wherein said high molecular weight-side 15 wt % fraction is a fraction of said oxytetramethylene glycol copolymer, which fraction corresponds to the area of a part of a whole peak representing the molecular weight distribution over the whole range of from a low molecular weight to a high molecular weight in a gel permeation chromatogram of said oxytetramethylene glycol copolymer, wherein said part is taken on the side of the high molecular weight including the maximum molecular weight in said whole peak and wherein the area of said part of the whole peak is 15%, based on the area of said whole peak;

said method comprising:

subjecting tetrahydrofuran and neopentyl glycol to a copolymerization reaction in the presence of a heteropolyacid catalyst to form a reaction system, said copolymerization reaction being continuously performed in the presence of water in a continuous copolymerization reactor while continuously feeding tetrahydrofuran and neopentyl glycol to the continuous copolymerization reactor and while continuously removing water which is by-produced in the copolymerization reaction so that the amount of water in the reaction system is adjusted to a level wherein a two-phase reaction system is formed which comprises an organic phase comprising a solution of neopentyl glycol in tetrahydrofuran and having a neopentyl glycol concentration of from 0.1 to 1.0 weight %, based on the weight of the organic phase, and a tetrahydrofuran/aqueous heteropolyacid phase comprising a solution of an aqueous heteropolyacid catalyst in tetrahydrofuran and having a specific gravity of from 1.8 to 2.3, the by-produced water being continuously removed by azeotropically distilling off water and tetrahydrofuran from the reaction system and returning tetrahydrofuran to the reaction system in an amount which is equivalent to the amount of tetrahydrofuran removed by the azeotropic distillation, wherein said continuous copolymerization reaction is continued while maintaining said two-phase reaction system, to thereby form a copolymerization reaction mixture comprising a reaction-formed organic phase containing a oxytetramethylene glycol copolymer having a number average molecular weight of from 800 to 5000 and a reaction-formed tetrahydrofuran/aqueous heteropolyacid phase;

separating said reaction-formed organic phase containing said oxytetramethylene glycol copolymer from said copolymerization reaction mixture; and separating and purifying said oxytetramethylene glycol copolymer from said reaction-formed organic phase.

2. The method according to claim 1, wherein said tetrahydrofuran/aqueous heteropolyacid phase has a specific gravity of from 1.9 to 2.3.

3. The method according to claim 1, wherein the azeotropic distillation of water and tetrahydrofuran is performed by withdrawing a gaseous phase containing the azeotropic vapor of water and tetrahydrofuran from the reaction system.

4. The method according to claim 1, wherein the azeotropic distillation of water and tetrahydrofuran is performed by separating the reaction system into the organic phase and the catalyst phase and, then, withdrawing the azeotropic vapor of water and tetrahydrofuran from the organic phase.

* * * * *